(12) United States Patent
Kajikawa et al.

(10) Patent No.: US 6,727,345 B2
(45) Date of Patent: Apr. 27, 2004

(54) CONTINUOUS PRODUCTION PROCESS FOR WATER-ABSORBENT RESIN POWDER AND POWDER SURFACE DETECTOR USED THEREFOR

(75) Inventors: Katsuhiro Kajikawa, Himeji (JP); Toru Nishioka, Himeji (JP); Hirotama Fujimaru, Himeji (JP); Kunihiko Ishizaki, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 34 days.

(21) Appl. No.: 10/183,381

(22) Filed: Jun. 28, 2002

(65) Prior Publication Data

US 2003/0020199 A1 Jan. 30, 2003

(30) Foreign Application Priority Data

Jul. 3, 2001 (JP) .......................... 2001-202497

(51) Int. Cl.$^7$ ................................. C08J 3/00
(52) U.S. Cl. ................... 528/502 R; 528/480; 528/481
(58) Field of Search ................. 528/480, 481, 528/502 R

(56) References Cited

U.S. PATENT DOCUMENTS

| | | |
|---|---|---|
| 4,043,952 A | 8/1977 | Ganslaw et al. |
| 4,051,086 A | 9/1977 | Reid |
| 4,286,082 A | 8/1981 | Tsubakimoto et al. |
| 4,625,001 A | 11/1986 | Tsubakimoto et al. |
| 4,666,983 A | 5/1987 | Tsubakimoto et al. |
| 4,734,478 A | 3/1988 | Tsubakimoto et al. |
| 4,755,560 A | 7/1988 | Ito et al. |
| 4,863,989 A | 9/1989 | Obayashi et al. |
| 4,873,299 A | 10/1989 | Nowakowsky et al. |
| 4,959,060 A | 9/1990 | Shimomura et al. |
| 4,973,632 A | 11/1990 | Nagasuna et al. |
| 4,985,518 A | 1/1991 | Alexander et al. |
| 5,124,416 A | 6/1992 | Haruna et al. |
| 5,145,906 A | 9/1992 | Chambers et al. |
| 5,148,943 A | 9/1992 | Moller |
| 5,244,735 A | 9/1993 | Kimura et al. |
| 5,264,495 A | 11/1993 | Irie et al. |
| 5,380,808 A | 1/1995 | Sumiya et al. |
| 5,409,771 A | 4/1995 | Dahmen et al. |
| 5,797,893 A | 8/1998 | Wada et al. |
| 5,849,405 A | 12/1998 | Wang et al. |
| 6,228,930 B1 | 5/2001 | Dairoku et al. |
| 6,291,636 B1 | 9/2001 | Miyake et al. |
| 2001/0006267 A1 * | 7/2001 | Harada et al. ........... 528/502 R |

FOREIGN PATENT DOCUMENTS

| | | |
|---|---|---|
| DE | 40 20 780 C1 | 6/1990 |
| EP | 0 349 240 | 1/1990 |
| EP | 0 629 411 A1 | 12/1994 |
| EP | 0 811 636 A1 | 12/1997 |
| EP | 0 885 917 A2 | 12/1998 |
| EP | 0 922 717 A1 | 6/1999 |
| EP | 0 940 148 A1 | 9/1999 |
| EP | 0 940 149 A1 | 9/1999 |
| EP | 0 955 086 A2 | 11/1999 |
| EP | 1 029 886 | 8/2000 |
| EP | 1 097 946 | 5/2001 |
| EP | 1 099 474 A1 | 5/2001 |
| EP | 1 118 633 A2 | 7/2001 |
| EP | 1 130 045 A2 | 9/2001 |
| EP | 1 153 656 A2 | 11/2001 |
| JP | 51-136588 | 11/1976 |
| JP | 52-117393 | 10/1977 |
| JP | 58-180233 | 10/1983 |
| JP | 59-57833 | 4/1984 |
| JP | 59-189103 | 10/1984 |
| JP | 61-16903 | 1/1986 |
| JP | 252212 | 11/1986 |
| JP | 61-257235 | 11/1986 |
| JP | 61-264006 | 11/1986 |
| JP | 61-274225 | 12/1986 |
| JP | 62-7745 | 1/1987 |
| JP | 1-305321 | 12/1989 |
| JP | 6-41319 | 2/1994 |
| JP | 8-39543 | 2/1996 |
| JP | 9-101194 | 4/1997 |
| JP | 9-509591 | 9/1997 |
| JP | 10-197322 | 7/1998 |
| JP | 11-5847 | 1/1999 |
| JP | 11-12367 | 1/1999 |
| JP | 11-139563 | 5/1999 |
| JP | 11-240959 | 9/1999 |
| JP | 11-263850 | 9/1999 |
| JP | 11-267500 | 10/1999 |
| JP | 11-286611 | 10/1999 |
| JP | 315148 | 11/1999 |
| JP | 11-315216 | 11/1999 |
| JP | 2000-38407 | 2/2000 |
| JP | 2001-96151 | 4/2001 |
| JP | 2001-139149 | 5/2001 |
| JP | 2001-147151 | 5/2001 |
| WO | WO 01/38402 A1 | 5/2001 |

* cited by examiner

*Primary Examiner*—Fred Teskin
(74) *Attorney, Agent, or Firm*—Roylance, Abrams, Berdo & Goodman, L.L.P.

(57) ABSTRACT

A surface-modified water-absorbent resin powder is produced continuously with high productivity in a state where the particle diameter distribution is narrow and where the properties are high by a process comprising a polymerizing step, a drying step, a pulverizing step, a classifying step, and a surface-modifying step, and further, conveying steps of connecting them, wherein the conveying steps include at least two hoppers for storing the water-absorbent resin powder. A powder surface detector used favorably for this process includes a float hung down by a hanging line.

11 Claims, 4 Drawing Sheets

CONTINUOUS PRODUCTION PROCESS FOR WATER-ABSORBENT RESIN POWDER AND POWDER SURFACE DETECTOR USED THEREFOR

BACKGROUND OF THE INVENTION

A. Technical Field

The present invention relates to a continuous production process for a water-absorbent resin powder and a powder surface detector used therefor. More specifically, the invention relates to a continuous production process for a surface-modified water-absorbent resin powder and a powder surface detector used therefor wherein the production process is a process for continuously producing a surface-modified water-absorbent resin powder comprising a polymerizing step, a drying step, a pulverizing step, a classifying step, and a surface-modifying step, and further, conveying steps of connecting these steps, and enhances the surface-modifying effect on the water-absorbent resin to give the surface-modified water-absorbent resin powder exhibiting a high absorption capacity, both without load and under a load, and a high saline flow conductivity.

B. Background Art

In recent years, water-absorbent resins are widely used as constituent materials of sanitary materials, such as disposable diapers, sanitary napkins, and so-called incontinent pads, for the purpose of causing the water-absorbent resins to absorb body fluids. Examples of the water-absorbent resins include: crosslinked products of partially neutralized polyacrylic acids; hydrolyzed products of starch-acrylic acid graft polymers; saponified products of vinyl acetate-acrylic acid ester copolymers; hydrolyzed products of acrylonitrile- or acrylamide copolymers, or crosslinked products of these hydrolyzed products; and crosslinked polymers of cationic monomers.

As properties which the above water-absorbent resins should have, there are generally cited such as excellent water absorption quantity, water absorption rate, gel strength, gel liquid permeability, and suction force to suck up water from base materials containing aqueous liquids such as body fluids, when the water-absorbent resins contacts the aqueous liquids.

Various water-absorbent resins, combing these properties and displaying excellent performance when they are used for sanitary materials (e.g. disposable diapers and sanitary napkins), have been proposed hitherto.

As to a method for improving absorption properties (e.g. absorption capacity without load and absorption capacity under a load) of a water-absorbent resin with good balance, there are known arts in which surfaces of water-absorbent resin powder are modified, for example, arts for modification in which: surfaces of water-absorbent resin particles are crosslinked, or a water-insoluble powder is attached to surfaces of water-absorbent resin particles, or deodorants, antibacterial agents, durability-enhancing agents, or other additives are attached to water-absorbent resin powder.

As to the surface-crosslinking art, it is known from such as JP-A-180233/1983, JP-A-016903/1986, JP-A-189103/1984, JP-A-117393/1977, JP-A-136588/1976, JP-A-257235/1986, JP-A-007745/1987, JP-A-211305/1986, JP-A-252212/1986, JP-A-264006/1986, DE 4020780, and JP-A-315216/1999. As to the water-insoluble-powder-attaching art, for example, JP-A-012367/1999 discloses a process in which fine silica powder or fine organic powder is added to water-absorbent resin powder. As to the art for modification in which deodorants, antibacterial agents, durability-enhancing agents, or other additives are added to water-absorbent resin powder, it is for example disclosed in JP-A-005847/1999, JP-A-267500/1999, and JP-A-315148/1999.

By the way, in recent years, as the production output of water-absorbent resins increases, each step of their production is more and more made continuous. However, the tendency is toward that, as water-absorbent resins having higher properties are demanded, such as surface-modifying step or fine-powder-recovering step is more and more added, therefore the number of steps increases and the production line becomes longer. Also in terms of properties, there is demanded a water-absorbent resin powder having a very narrow particle diameter distribution or a water-absorbent resin powder having a high water absorption capacity and a low water-extractable content, and further in recent years, it is being demanded that such as absorption capacity under a load or liquid permeability under a load should need to be high.

However, when attempts are made to obtain water-absorbent resins having such high properties with high productivity, it is very difficult to stabilize the production with high properties, and generally, the high properties and the high productivity conflict with each other in continuous production. Generally, the properties have hitherto tended to be deteriorated if the production output (scale) is raised. That is to say, in a process for continuously producing a surface-modified water-absorbent resin powder comprising a polymerizing step, a drying step, a pulverizing step, a classifying step, and a surface-modifying step, and further, conveying steps of connecting these steps, it has hitherto been very difficult to continuously produce a water-absorbent resin having a narrow particle diameter distribution and high properties with high productivity.

SUMMARY OF THE INVENTION

A. Object of the Invention

Considering the present circumstances as mentioned above, an object of the present invention is to provide:

a process for continuously producing a water-absorbent resin having a narrow particle diameter distribution and high properties with high productivity in a process for continuously producing a surface-modified water-absorbent resin powder comprising a polymerizing step, a drying step, a pulverizing step, a classifying step, and a surface-modifying step, and further, conveying steps of connecting these steps; and a powder surface detector used for the above objective process.

B. Disclosure of the Invention

As a result of various study to solve the above problems and of repeated trials and errors, the present inventors have found out that: for the purpose of continuously producing a water-absorbent resin powder of high quality with high productivity by a process comprising a polymerizing step, a drying step, a pulverizing step, a classifying step, and a surface-modifying step, and further, conveying steps of connecting these steps, it is the most important to control a flow rate of the water-absorbent resin powder, and it is enough to supply a constant quantity of water-absorbent resin powder after adroitly making such control.

In addition, the present inventors have made arrangements such that: the above conveying steps include at least two hoppers, and the above quantifying-and-supplying hopper include: a supplying part which is placed in an upper portion of a tank for storing a water-absorbent resin powder and serves for supplying the powder into the tank; a discharging part which is placed in a lower portion of the tank and serves for quantifying the water-absorbent resin powder in the tank and discharging it therefrom; and a detector for detecting the quantity of the powder in the tank. In this way, the present inventors have succeeded in connecting the above findings to practical technique, and have completed the process according to the present invention and further a powder surface detector which is convenient to carry out this process.

That is to say, a continuous production process for a water-absorbent resin powder, according to the present invention, is a process for continuously producing a surface-modified water-absorbent resin powder comprising a polymerizing step, a drying step, a pulverizing step, a classifying step, and a surface-modifying step, and further, conveying steps of connecting these steps, and is characterized in that:

the water-absorbent resin powder is obtained by a process including the step of polymerizing an unsaturated monomer and has a crosslinked structure, and has a mass-average particle diameter of 300 to 600 $\mu$m, and includes particles having particle diameters of 850 to 150 $\mu$m in a ratio of not less than 90 mass % in particle diameter distribution, and has a property of displaying an absorption capacity of not less than 25 g/g without load, and has a water-extractable content of not more than 25 mass %; and the conveying steps include at least two hoppers for storing and discharging the water-absorbent resin powder after the pulverizing step wherein at least one of the hoppers includes:
a tank for storing the water-absorbent resin powder;
a supplying part which is placed in an upper portion of the tank and serves for supplying the water-absorbent resin powder into the tank;
a discharging part which is placed in a lower portion of the tank and serves for discharging the water-absorbent resin powder from the tank; and
a detector for detecting the quantity of the powder in the tank.

The aforementioned at least two hoppers are usually a buffering hopper for storing and discharging the water-absorbent resin powder and a constant-quantity-supplying hopper which is placed downstream of the above buffering hopper and serves for quantifying and discharging the water-absorbent resin powder.

The above process according to the present invention can further comprise a second conveying step for conveying an additive powder for modifying the aforementioned water-absorbent resin powder, wherein the aforementioned second conveying step includes a constant-quantity-supplying hopper for quantifying and discharging at least the aforementioned additive powder as a hopper for storing the additive powder, wherein the aforementioned constant-quantity-supplying hopper includes:
a tank for storing the additive powder;
a supplying part which is placed in an upper portion of the tank and serves for supplying the additive powder into the tank;
a discharging part which is placed in a lower portion of the tank and serves for discharging the additive powder from the tank; and
a detector for detecting the quantity of the powder in the tank.

In addition, a powder surface detector, according to the present invention, is a detector provided to a tank for storing an additive powder as a superfine powder in order to detect a powder surface rising when accumulating the powder in the tank, and comprises:
a float which is supported movably up and down above the powder surface and of which the bottom contacts the powder surface when the powder surface has risen;
a hanging line for hanging down the float to support it movably up and down; and
a limit switch having a mover which serves for supporting the hanging line and is moved by a change of the weight, as applied through the hanging line, of the float.

Figure 1:
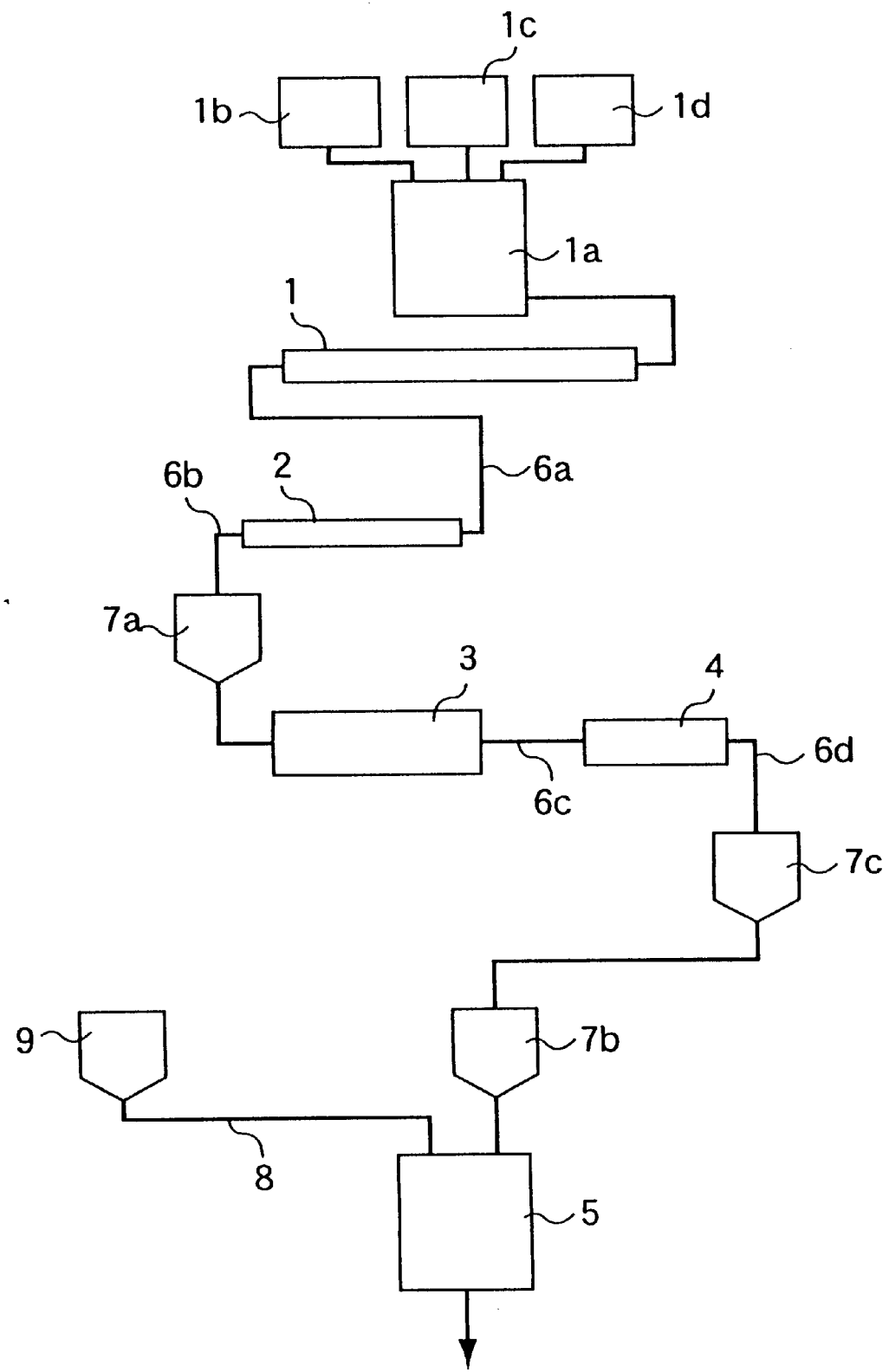
FIG. 1 is a flowchart showing a working example of the continuous production process for a water-absorbent resin powder according to the present invention.

An explanation of the symbols is as follows.

1: Polymerizing step
2: Drying step
3: Pulverizing step
4: Classifying step
5: Surface-modifying step
6a to 6d: Conveying steps
7a, 7c: Buffering hoppers
7c: Constant-quantity-supplying hopper
8: Second conveying step
9: Constant-quantity-supplying hopper
10: Powder surface detector
14: Supporting arm
20: Limit switch
24: Mover
30: Float
32: Hanging line
50: Tank
100: Buffering hopper
101: Tank
102: Supplying part
103: Discharging part
104: Detector
110: Constant-quantity-supplying hopper
111: Tank
112: Supplying part
113: Discharging part
114: Detector

DETAILED DESCRIPTION OF THE INVENTION

Hereinafter, a detailed description is made about modes for carrying out the present invention.

Water-Absorbent Resin Powder

In the present invention, the water-absorbent resin means not only water-absorbent resin 100%, but a composition comprising a water-absorbent resin and such as an additive (e.g. modifying agent) or water as contained in the water-absorbent resin is also generically called water-absorbent resin, because, even if the water-absorbent resin contains water in an almost equal quantity, such a water-absorbent resin is not different from a dry powder thereof both in appearance and handling. Accordingly, not only in the case where the pure resin content is 100 mass %, but even in the case where the pure resin content is not less than 90 mass %, and even in the case where the pure resin content is not less than 80 mass %, and further even in the case where the pure resin content is not less than 50 mass %, such may be called water-absorbent resin. It is preferable that the water-absorbent resin has a high resin content. Incidentally, herein the mass (mass %) is dealt with as a synonym of weight (weight %).

In the present invention, usually, the water-absorbent resin means a water-swellable and water-insoluble hydrophilic crosslinked polymer which, for example, absorbs at least 5 times, favorably 50 to 1,000 times, as large a quantity of water as its own weight in ion-exchanged water or physiological saline, and thereby forms an anionic, nonionic, or cationic water-insoluble hydrogel.

The present invention enables easy production of a water-absorbent resin powder that has good absorption properties excellent in balance of absorption capacity without load, absorption capacity under load, and saline flow conductivity, and the resultant water-absorbent resin powder is widely used for such as water-retaining agents for agriculture and horticulture, industrial water-retaining agents, moisture-absorbing agents, moisture-removing agents, and building materials. However, this water-absorbent resin powder can particularly favorably be used for sanitary materials for absorbing feces, urine, or blood, such as disposable diapers and sanitary napkins. The water-absorbent resin powder as obtained by the production process according to the present invention is, as mentioned below, excellent in various properties with good balance. Therefore, in the case where used as a sanitary material, the water-absorbent resin powder can be used in a high concentration for a concentration of conventional water-absorbent resin powder (mass ratio of water-absorbent resin powder to the total of water-absorbent resin powder and fibrous material), for example, in the range of 30 to 100 mass %, favorably 40 to 100 mass %, more favorably 50 to 95 mass %.

The properties of the water-absorbent resin powder as obtained in preferable modes for carrying out the present invention are as follows.

(a) Particle diameter:

The water-absorbent resin powder is obtained by a process including the step of polymerizing an unsaturated monomer and has a crosslinked structure, and has a mass-average particle diameter of 300 to 600 $\mu$m, and includes particles having particle diameters of 850 to 150 $\mu$m in a ratio of not less than 90 mass %, and has a property of displaying an absorption capacity of not less than 25 g/g without load, and has a water-extractable content of not more than 25 mass %.

As to the particle diameter of the water-absorbent resin powder, it has a narrow particle diameter distribution, specifically, such that: the mass-average particle diameter is in the range of 300 to 600 $\mu$m, and the ratio of particles having particle diameters of 850 to 150 $\mu$m is in the range of 90 to 100 mass %. The mass-average particle diameter is favorably in the range of 350 to 550 $\mu$m, more favorably 400 to 500 $\mu$m, and the ratio of particles having particle diameters of 850 to 150 $\mu$m is favorably in the range of 95 to 100 mass %, more favorably 98 to 100 mass %. The process according to the present invention is favorable for controlling the particle diameter into such ranges, and such a particle diameter control gives sanitary materials having high properties and exhibiting little leakage. Furthermore, the bulk density (defined by JIS K-3362) of the water-absorbent resin powder is favorably in the range of 0.40 to 0.80 g/ml, more favorably 0.50 to 0.75 g/ml, still more favorably 0.60 to 0.73 g/ml, from the viewpoint of excellent properties of the water-absorbent resin.

(b) Absorption capacity:

The absorption capacity (CRC) of the water-absorbent resin powder for a 0.90 mass % physiological saline is not less than 25 g/g, favorably not less than 31 g/g. Because the CRC is not less than 31 g/g, the absorption of the sanitary material is critically excellent, and a compact sanitary material can be achieved, and further it also results in lowering the cost of an absorbent structure, and the process according to the present invention is favorable for giving such properties stably. The CRC is more favorably not less than 32 g/g, still more favorably not less than 33 g/g, yet still more favorably not less than 34 g/g, particularly favorably not less than 35 g/g, more particularly favorably not less than 36 g/g.

(c) Water-Extractable Content:

The water-absorbent resin powder is substantially water-insoluble, and its water-extractable content (extractable content) is not more than 25 mass %, favorably not more than 20 mass %, more favorably not more than 10 mass %. Because the extractable content is low, the gel stability is also enhanced, and further as to sanitary materials, the slimy feel disappears, and the process according to the present invention is favorable for giving such properties stably.

(d) Absorption Capacity Under Load:

The water-absorbent resin powder favorably exhibits a 60 minutes' absorption capacity of not less than 20 g/g under a load of 4.83 kPa (AAP) for a 0.90 mass % physiological saline, and the process according to the present invention is favorable for giving such properties stably. Because the AAP is not less than 20 g/g, when the water-absorbent resin powder is partially used as a water-absorbent structure (which means a water-absorbent portion comprising fibrous material and water-absorbent resin) of disposable diapers, the effect such that the urine as absorbed by the water-absorbent structure is prevented from returning to the surface of the diaper is very great. The absorption capacity under a load is more favorably not less than 22 g/g, still more favorably not less than 24 g/g, yet still more favorably not less than 25 g/g, particularly favorably not less than 26 g/g, more particularly favorably not less than 27 g/g. In the case where the absorption capacity under a load is less than 20 g/g, there are disadvantages in that the effect such that the urine as absorbed by the water-absorbent structure is prevented from returning to the surface of the diaper is very poor.

(e) Saline flow conductivity:

The water-absorbent resin powder favorably exhibits a saline flow conductivity (SFC) of not less than 20 (unit: $10^{-7} \times cm^3 \times s \times g^{-1}$) for a 0.69 mass % physiological saline. The SFC has a very great influence on the liquid permeability of the water-absorbent resin powder after the water-absorbent resin powder is swollen. For example, when the water-absorbent resin powder is partially used as a water-absorbent structure of disposable diapers, the following effects are remarkably improved: the liquid permeability is improved, and the liquid spreads enough throughout the water-absorbent structure, and the water absorption quantity is increased, and the leak of the liquid is prevented. The SFC is more favorably not less than 25 ($10^{-7} \times cm^3 \times s \times g^{-1}$/ hereinafter the unit is the same), still more favorably not less than 30, yet still more favorably not less than 35, particularly favorably not less than 40, more particularly favorably not less than 50. In the case where the SFC is less than 20, there are disadvantages, for example, in that: when the water-absorbent resin powder is partially used as a water-absorbent structure of disposable diapers, the liquid permeability is lowered, and the liquid is localized in the water-absorbent structure, and the liquid absorption quantity is decreased, and the leak of the liquid is increased, and therefore the properties as the water-absorbent structure are greatly lowered.

The above properties of the water-absorbent resin powder are measured in the following ways.

(a) Particle diameter (Mass-Average Particle Diameter):

The water-absorbent resin powder was classified by sieving with JIS standard sieves having mesh opening sizes of such as 850 μm, 600 μm, 500 μm, 425 μm, 300 μm, 212 μm, 150 μm, 106 μm, and 75 μm, and then the percentages of the residues on these sieves, R, were plotted on logarithmic probability paper. Therefrom, the mass-average particle diameter (D50) is read.

(b) Absorption Capacity (Absorption Capacity Without Load: CRC):

This is a 30 minutes' absorption capacity for a 0.90 mass % physiological saline without load. A quantity of 0.2 g of water-absorbent resin powder was uniformly placed into a nonwoven-fabric-made bag (60 mm×60 mm) and then immersed into a 0.9 mass % physiological saline at room temperature. After 30 minutes, the bag was pulled up and then drained of water at 250 G with a centrifugal separator for 3 minutes, and then the mass W1 (g) of the bag was measured. In addition, the same procedure was carried out without using any water-absorbent resin, and the mass W0 (g) of the bag resultant from that case was measured. Then, the absorption capacity (g/g) without load is calculated from these W1 and W0 in accordance with the following equation:

Absorption capacity (g/g) without load=($W1(g)-W0(g)$)/mass (g) of water-absorbent resin powder (c) Water-Extractable Content (Extractable Content):

Into a plastic receptacle of 250 ml in capacity having a lid, 184.3 g of 0.9 mass % aqueous NaCl solution (physiological saline) was weighed out. Then, 1.00 g of water-absorbent resin powder was added into this aqueous solution, and they were stirred for 16 hours, whereby the extractable content in the water-absorbent resin powder was extracted. The resultant extract liquid is filtrated with a filter paper, and then 50.0 g of the resultant filtrate is weighed out and regarded as a solution for measurement.

Hereinafter, the extractable content was determined by pH titration of eluted poly(acrylic acid (salt)).

(d) Absorption Capacity Under Load (AAP):

This is a 60 minutes' absorption capacity for a 0.90 mass % physiological saline under a load of 4.83 kPa. A quantity of 0.900 g of water-absorbent resin powder is uniformly spread on a stainless wire net of 400 mesh (mesh opening size: 38 μm) as attached by fusion to the bottom of a plastic supporting cylinder having an inner diameter of 60 mm, on which water-absorbent resin powder a piston and a load are further mounted in sequence, wherein: the piston has an outer diameter only a little smaller than 60 mm so as to make no gap with the supporting cylinder, but not to be hindered from moving up and down, and the piston and the load are adjusted to uniformly apply a load of 4.83 kPa to the water-absorbent resin powder. Then, the mass Wa (g) of the resultant one set of measurement apparatus is measured. A glass filter of 90 mm in diameter is mounted inside a Petri dish having a diameter of 150 mm, and a 0.9 mass % physiological saline (25° C.) is added up to the same level as the glass filter, on which a filter paper having a diameter of 90 mm is then mounted such that its entire surface will be wetted, and the excessive liquid is removed. The above one set of measurement apparatus is mounted on the above wet filter paper, thereby allowing the liquid to be absorbed under a load. After 1 hour, the one set of measurement apparatus is lifted, and its mass Wb(g) is measured. Then, the absorption capacity (g/g) under a load is calculated from these Wa and Wb in accordance with the following equation:

Absorption capacity (g/g) under load=($Wa(g)-Wb(g)$)/mass of water-absorbent resin (($0.9$)g)

(e) Saline Flow Conductivity (SFC):

The following test is carried out according to the saline flow conductivity (SFC) test as described in JP-A-509591/1997. Specifically, a water-absorbent resin powder (0.900 g) as uniformly placed in a receptacle 40 is swollen with artificial urine under a load of 0.3 psi (2.07 kPa) for 60 minutes, and the layer thickness of the resultant gel is recorded. Next, under the load of 0.3 psi (2.07 kPa), a 0.69 mass % aqueous sodium chloride solution is passed through the swollen gel layer from a tank under a constant hydrostatic pressure. This SFC test is carried out at room temperature (20 to 25° C.). The quantity of the liquid passing through the gel layer is recorded as a function to time with a computer and a balance at twenty seconds' intervals for 10 minutes. The flow rate passing through the swollen gel (mainly between particles thereof), $F_s$ (t), is determined in the unit g/s by dividing the mass increment (g) by the time increment (s). The time when a constant hydrostatic pressure and a stable flow rate are obtained is regarded as $t_s$, and only the data collected between $t_s$ and 10 minutes are used for the flow rate calculation, and the value of $F_s$ (t=0), namely, the initial flow rate passing through the gel layer, is calculated from the flow rate obtained between $t_s$ and 10 minutes. $F_s$ (t=0) is calculated by extrapolating t=0 from the results of the least squares method as to $F_s$ (t) versus time.

Saline flow conductivity=($F_s(t=0) \times L_0$)/($\rho \times A \times \Delta P$)

=($F_s(t=0) \times L_0$)/139,506 where:
$F_s$ (=0): flow rate expressed in g/s;
$L_0$: thickness of gel layer expressed in cm;
ρ: density of NaCl solution (1.003 g/cm$^3$);
A: area of the top of gel layer in cell 41 (28.27 cm$^2$);
ΔP: hydrostatic pressure applied to gel layer (4,920 dyne/cm$^2$); and the unit of the SFC value is ($10^{-7} \times$ cm$^3 \times$ S $\times$ g$-1$)

The artificial urine as used is a product obtained by adding 0.25 g of calcium chloride dihydrate, 2.0 g of potassium chloride, 0.50 g of magnesium chloride hexahydrate, 2.0 g of sodium sulfate,; 0.85 g of ammonium dihydrogenphosphate, 0.15 g of diammonium hydrogenphosphate, and 994.25 g of pure water.

Production Line of Water-Absorbent Resin Powder

The present invention enables continuous production of a surface-modified water-absorbent resin powder via the below-mentioned continuous process.

As is shown in FIG. 1, this continuous process comprises a polymerizing step 1, a drying step 2, a pulverizing step 3, a classifying step 4, and a surface-modifying step 5, and these steps 1 to 5 are connected to each other through the conveying steps 6a to 6d. In the polymerizing step 1, a polymerizable monomer, an initiator, and an internal crosslinking agent are supplied from raw material tanks 1b, 1c, and 1d respectively into a mixing tank 1a and therein continuously mixed together, and then polymerization is continuously carried out. The resultant gelled crosslinked polymer is fed via the conveying step 6a to the drying step 2 and therein continuously dried, and then fed via the conveying step 6b to the pulverizing step 3 wherein the conveying step 6b is provided with a buffering hopper 7a for balancing the drying quantity in the drying step 2 and the pulverizing quantity in the pulverizing step 3 with each other. Specifically, in the case where the pulverizing quantity is small, the water-absorbent resin powder is temporarily stored in this buffering hopper 7a after being dried. On the other hand, in the case where the pulverizing quantity is large, the gelled crosslinked polymer (or its dried particulate product) as stored in this buffering hopper 7a is discharged therefrom in a somewhat larger quantity to get balance. The water-absorbent resin powder resultant from the pulverizing step 3 is fed via the conveying step 6c to the classifying step 4. This conveying step 6c may be provided with a buffering hopper The water-absorbent resin powder resultant from the classifying step 4 is fed via the conveying step 6d to the surface-modifying step 5. Although not drawn, there is also a case where a classifying step is further included after the surface-modifying step 5, if necessary. In the above, the conveying step 6d is provided with a constant-quantity-supplying hopper 7b for making the quantity of the water-absorbent resin powder, as fed to the surface-modifying step 5, constant, because the quantitative constancy of the supply is extremely important for enhancing the surface-modifying effect. For enhancing the quantitative constancy as given by the constant-quantity-supplying hopper 7b, it is important to keep the quantity of the powder in the constant-quantity-supplying hopper 7b within a certain range, therefore a buffering hopper 7c is set upstream of the constant-quantity-supplying hopper 7b.

Into the surface-modifying step 5 via a second conveying step 8, there is supplied an additive powder as a superfine powder for the surface-modifying from a second constant-quantity-supplying hopper 9. Unlike the water-absorbent resin powder, the additive powder does not continue being supplied constantly to the hopper while modifying the surface. Therefore, as to the additive powder, it is usually unnecessary to set a buffering hopper upstream.

(Buffering Hopper and Constant-Quantity-Supplying Hopper):

As to the buffering hopper and the constant-quantity-supplying hopper as provided to the steps of conveying the water-absorbent resin powder, two examples of their disposition method are explained in detail below.

Figure 2:
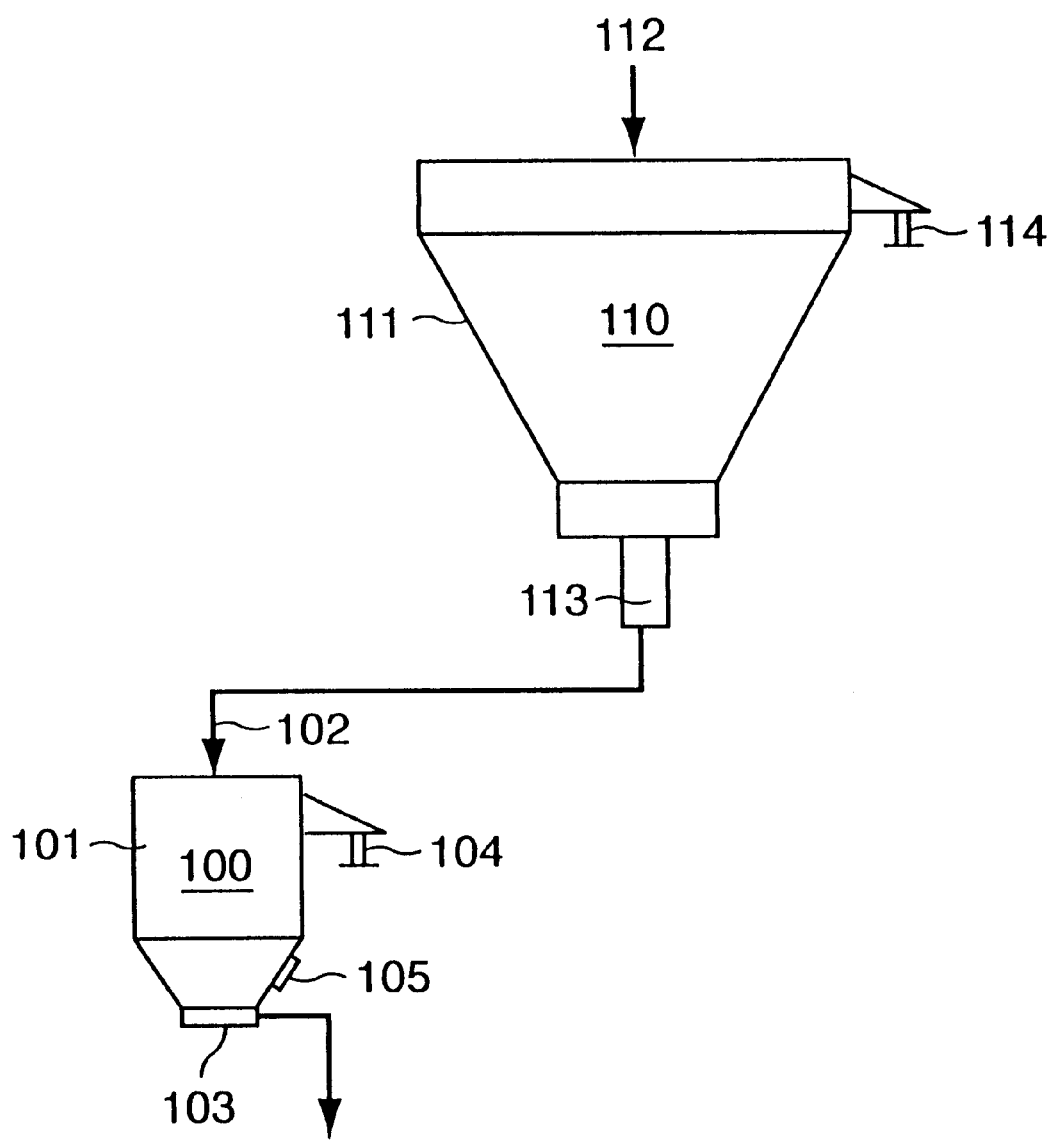
FIG. 2 is a figure showing an example of dispositions of the buffering hopper and the constant-quantity-supplying hopper which are used in the working example of FIG. 1 above.

As is shown in FIG. 2, a constant-quantity-supplying hopper 100 includes: a tank 101 for storing the water-absorbent resin powder; a supplying part 102 which is placed in an upper portion of the tank 101 and serves for supplying the water-absorbent resin powder into the tank 101; a discharging part 103 which is placed in a lower portion of the tank 101 and serves for quantifying the water-absorbent resin powder in the tank 101 and discharging it therefrom; and a detector 104 for detecting the quantity of the powder in the tank 101. In this working example, the detector 104 is a load cell type and has a mechanism of detecting the quantity of the water-absorbent resin powder in the tank 101 in a form of subtracting the mass of the tank 101 from the total mass of the tank 101 and the water-absorbent resin powder as stored therein. The lower portion of the tank 101 is provided with a vibrator 105, and the tank 101 is an inner-surface-vibrating type. Specifically, the tank 101 utilizes vibration of the vibrator 105 for preventing the water-absorbent resin powder in the tank 101 from adhering to the inner surface of the tank and for smoothing the movement of the water-absorbent resin powder by its own weight to the lower portion of the tank. Incidentally, the load cell is to measure the weight, but is herein referred to under unification with the mass.

On the other hand, a buffering hopper 110 which is set upstream of a constant-quantity-supplying hopper 100 includes: a tank 111 for storing the water-absorbent resin powder; a supplying part 112 which is placed in an upper portion of the tank 111 and serves for supplying the water-absorbent resin powder into the tank 111; a discharging part 113 which is placed in a lower portion of the tank 111 and serves for discharging the water-absorbent resin powder from the tank 111; and a detector 114 for detecting the quantity of the powder in the tank 111. This detector 114 is also a load cell type. The buffering hopper 110 is provided for balancing the producing quantity and the surface-treating quantity with each other as to a hydrogel polymer which will form the water-absorbent resin powder. Therefore, this hopper does not need any strict control of its storing quantity. Accordingly, the detector 114 may be omitted. The tank 111 is not provided with any vibrator, but may be made an inner-surface-vibrating type as provided therewith.

Because of being set downstream of the buffering hopper 110, the constant-quantity-supplying hopper 100 can keep its inner storing quantity constantly within a predetermined range and is therefore good in the quantitative constancy.

With regard to the implementing mode of FIG. 2, an example of its operating method is mentioned below.

① A water-absorbent resin powder (not yet surface-treated) which is a product obtained by a process including the polymerizing, drying, pulverizing, and classifying steps is placed into the buffering hopper 110.

② The quantity of the powder is monitored with the load cell type detector 114 as provided to the buffering hopper 110.

③ Because the buffering hopper 110 has a cutting-off valve and a rotary valve in the discharging part 113, these valves are opened to discharge the water-absorbent resin powder from inside to a conveying step such as conveyor type.

④ The constant-quantity-supplying hopper 100 receives, from its supplying part 102, the water-absorbent resin powder as fed from the buffering hopper 110 via the conveying step. The constant-quantity-supplying hopper 100 constantly monitors the quantity of the water-absorbent resin powder, as stored therein, with the load cell type detector 104, and controls the opening and shutting of the cutting-off valve of the buffering hopper 110 so that the quantity of the powder in the tank 101 will be within a certain range.

⑤ The constant-quantity-supplying hopper 100 feeds a predetermined quantity of water-absorbent resin powder from the discharging part 103 to a surface-treating-agent-mixing apparatus (drawing omitted) while quantifying the water-absorbent resin powder in this hopper. Although not drawn, a surface treating agent is also fed into the surface-treating-agent-mixing apparatus at the same time.

⑥ After mixing by the surface-treating-agent-mixing apparatus, the resultant humidified product is supplied to a heat-treating machine (drawing omitted) to carry out a surface-crosslinking reaction, thus obtaining a water-absorbent resin powder (having been surface-treated).

Hereinafter, the above constant-quantity-supplying hopper is more specifically explained.

In the present invention, the constant-quantity-supplying hopper is, as mentioned above, used in each conveying step. This constant-quantity-supplying hopper includes: the tank; the supplying part for supplying the powder into the tank; the discharging part for discharging the powder from the tank; and the detector for detecting the quantity of the water-absorbent resin powder or the additive powder in the tank.

Because the first conveying step involves feeding the water-absorbent resin powder to the surface-modifying step while producing it, the first conveying step further includes a buffering 2 hopper for getting the quantitative balance between the above feeding and production. The buffering hopper does not need strict quantitative constancy, but likewise includes the detector for detecting the quantity of the water-absorbent resin powder in the tank besides the tank, the supplying part for supplying the powder into the tank, and the discharging part for discharging the powder from the tank.

Inside the buffering hopper or constant-quantity-supplying hopper, there are stored such as the surface-unmodified water-absorbent resin powder and/or the additive powder (e.g. inorganic fine powder). If the water-absorbent resin powder is temporarily stored midway of the conveying step by the buffering hopper with the powder detector and besides supplied in a constant quantity by the constant-quantity-supplying hopper, then the supply of the water-absorbent resin powder can precisely be controlled, so that the properties of the water-absorbent resin powder can be enhanced greatly and stabilized. In principle, the constant-quantity-supplying hopper alone is enough for the step of conveying the additive powder.

As to these hoppers, their tanks are made of metals such as stainless steel and favorably heat-retained or heated in the range of 40 to 100° C., more favorably 50 to 90° C., for preventing the powder, particularly, water-absorbent resin powder, from adhering and agglomerating.

The quantity of the powder in the constant-quantity-supplying hopper is favorably controlled into the range of 20 to 80% (capacity ratio), more favorably 30 to 70%, still more favorably 50 to 60%, relative to the tank capacity. Favorably, the control of the capacity ratio is carried out by measuring the mass of the powder. Such control stabilizes the supply of a constant quantity of water-absorbent resin powder or additive powder and thereby enables stable continuous production of the water-absorbent resin powder having high properties, which is an object of the present invention. In comparison, in the case where the process is carried out without providing the conveying steps with such hoppers, the properties of the water-absorbent resin powder become deteriorated or unstable. Incidentally, the storing quantity of the constant-quantity-supplying hopper is favorably smaller than that of the buffering hopper and, for example, favorably in the range of about 2/3 to about 1/30, more favorably about 1/3 to about 1/10, thereof.

The present invention is particularly suitable for mass production of the water-absorbent resin powder and is, for example, applied at a production output of the water-absorbent resin powder of not less than 500 Kg/hr, favorably not less than 750 Kg/hr, more favorably not less than 1,000 Kg/Hr.

Figure 3:
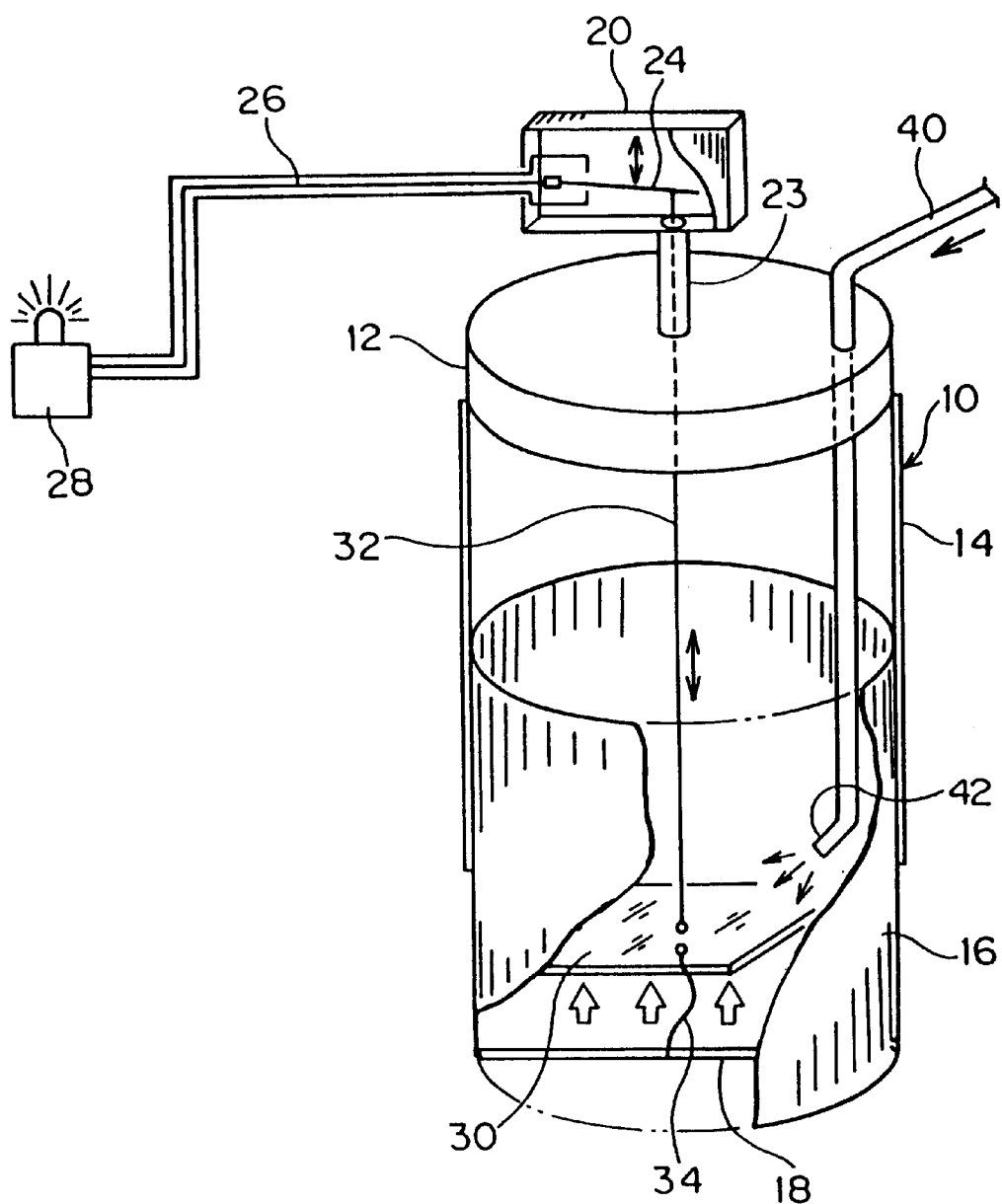
FIG. 3 is a partially sectional perspective showing a working example of the powder surface detector according to the present invention.

(Powder Quantity Detector):

Examples of the powder quantity detector as used in the present invention include the detector as used for the implementing mode of FIG. 2 or 3 and, if roughly classified, include: (a) a powder quantity detector with which the whole mass of the storing cylinder is measured and, if the blank mass of the tank is subtracted therefrom, the mass of the accumulated powder can be determined, wherein its specific examples include a load cell type; (b) a powder quantity detector which converts differences in tuning fork or vibration or differences in electrostatic capacity between powders into electric signals, thereby measuring the surface position of the powder, wherein its specific examples include a tuning fork type; (c) a powder quantity detector which is a detector of a type suitable for cases of detecting fine particles having extremely fine particle diameters and can detect a slight change of force as applied to a mover of a limit switch through a hanging line wherein the change of force is caused by contact of the risen powder surface with a super-lightweight float board as hung down by the hanging line; (d) a powder quantity detector with which a sound wave or light is irradiated to the powder surface and reflected therefrom, whereby the surface position of the powder is measured, wherein its specific examples include an ultrasonic type; and (e) a powder quantity detector with which the surface position of the powder is measured from a just length of a chain or the like at which a plumb as hung down by the chain or the like gets on the surface of the accumulated powder when the plumb is taken down onto the surface of the accumulated powder. Of these types (a) to (e) of powder quantity detectors, the types (a) to (c) are favorable, and the type (a) is more favorably used for the water-absorbent resin powder, and the type (c) for fine particles such as additives.

As is mentioned above, the powder quantity detector of the type (a) is favorably used when supplying the water-absorbent resin powder in a constant quantity particularly with good accuracy.

The powder-storing hopper usually has an inlet, for supplying the above powder, of a cylinder-shaped storing cylinder, and further has a discharging outlet in a lower portion. The powder, which has been supplied from the supplying inlet to the storing cylinder by a transporting means such as pneumatic-transportation or conveyors, accumulates in the storing cylinder. When the accumulated powder is used, the discharging outlet is opened to get a necessary quantity of powder out. When the powder is supplied from the supplying inlet to the storing cylinder by such as pneumatic-transportation or conveyors, the powder overflows the storing cylinder unless the supply of the powder is stopped in a stage when a predetermined quantity of powder has accumulated in the storing cylinder. What thus becomes necessary is a detecting means for measuring the quantity of the accumulated powder in the storing cylinder or detecting the reach to a predetermined limit. Particularly in the case where the water-absorbent resin powder is surface-crosslinked with a surface-crosslinking agent, it is necessary that the supply of the water-absorbent resin powder is carried out with very good accuracy, and that the quantity of the accumulated powder in the storing cylinder is constant. In other words, if the quantity of the accumulated powder in the storing cylinder is large, the bulk density of the powder as discharged from the discharging part becomes large by its own weight, and further, if the quantity of the accumulated powder in the storing cylinder is small, the bulk density of the powder as discharged from the discharging part becomes small and it therefore becomes difficult to supply a constant quantity. The hopper, which is put upstream of the supplying machine to which such a very good accuracy is demanded, needs to detect and control the quantity of the accumulated powder in the hopper with very good accuracy. In this respect, the powder quantity detector of the type (a) is, as aforementioned, a hopper including a powder quantity detector with which the whole mass of the storing cylinder is measured to subtract therefrom the blank mass of the storing cylinder, whereby the mass of the accumulated powder can be determined, and specifically, the quantity of the accumulated powder is accurately detected and further the obtained information is used to control the supply or discharge. The powder quantity detector of the type (a) is a device for continuously detecting the mass of the powder when the powder is accumulated, and this detector measures the mass of the whole hopper as edge-cut by flexible piping. Because of measuring the mass, this detector is not influenced by the state of the powder such as change of its bulk density, and further because of being able to carry out continuous monitoring, this detector can keep the quantity of the powder in the hopper almost constant, and further because of not directly contacting the powder, this detector is free from anxiety that a foreign substance may mingle thereinto.

Next, the powder quantity detector of the type (b) is also used when supplying the water-absorbent resin powder in a constant quantity with good accuracy.

In the case where a fine powder in the fine water-absorbent resin powder is returned to a granulating step to try to reuse it, the supply needs to be carried out in such a manner that no trouble will be caused by the fine water-absorbent resin powder. Specifically, even if the fine water-absorbent resin powder content becomes high or low due to a change of pulverizing conditions, it is necessary to carry out fine powder granulation and fine powder recovery according to that fine powder content. For carrying out them, it is necessary to detect the powder surface in various hoppers and to prevent, by the obtained information, the fine powder from overflowing or emptying. This needs many powder surface meters, and as such a powder quantity detector there can be used a tuning fork type powder quantity detector or a vibrating type powder quantity detector or an electrostatic capacity type powder quantity detector which are comparatively inexpensive and little make an incorrect action. As is aforementioned, the powder quantity detector of the type (b) converts differences in tuning fork vibration or differences in electrostatic capacity between powders into electric signals, thereby measuring the surface position of the powder. Specifically, there are favorably used powder quantity detectors such as tuning fork type level switches, vibratory type level switches, electrostatic capacity type level switches, rotary type level switches, and piston type level switches. Because of detection by a very simple principle utilizing differences in properties between powder and air, the powder quantity detector of the type (b) very little makes an incorrect action and is inexpensive, and is therefore utilizable for various hoppers.

The powder quantity detector of the type (c) is a detector of a type particularly suitable for cases of detecting fine particles having extremely fine particle diameters, but specific examples thereof will be mentioned below.

In the present invention, any of the above-mentioned powder quantity detectors can be used, but, of these, what are preferably used are the powder surface detector which detects the powder surface in the tank, or the powder quantity detector which measures the mass of the whole tank.

In the above-mentioned second conveying step, a superfine powder having extremely fine particle diameters such as fine silica powder needs to be supplied in a constant quantity, and it is therefore favorable to select the type of the powder quantity detector as provided to the constant-quantity-supplying hopper. From such a viewpoint, it is favorable to use the above powder surface detector, and it is particularly favorable to use the below-mentioned type which hangs down a float by use of a hanging line.

Hopper for Storing Superfine Powder

There is a hopper for storing a superfine powder as a device for accumulating the powder.

Herein the superfine powder means a powder having an average particle diameter of not larger than 1 $\mu$m, favorably in the range of 1 to 50 nm.

The hopper for storing the superfine powder basically has a structure common to a conventional hopper device for storing a powder.

Specifically, the hopper for storing the superfine powder has: a tank for storing the superfine powder; a supplying part which is placed in an upper portion of the tank and to which the superfine powder is supplied; and a constant-quantity-discharging part which is placed in a lower portion of the tank and serves for discharging the superfine powder.

The tank is made of a predetermined material and is provided with a predetermined shape and structure according to demanded performances such as superfine powder properties and storing capacity. A taper spreading from downward to upward can be provided to an inner surface of the tank so that the superfine powder may smoothly be discharged. The taper may be provided throughout the whole height of the tank, and it is also possible to provide the taper only near a lower portion near the discharging outlet. It is also possible that: of the inner surfaces of the tank, only one side surface is tilted, and the other surfaces are vertical.

The tank is generally of the shape of a cylinder, but the shape of an oval or angular cylinder is also available.

The supplying inlet is generally provided to the top of the tank, but may be placed on a side near the top. To the supplying inlet there is connected a powder-conveying means, specifically, pneumatic transportation piping. There is also a case where an end portion of various conveyor systems such as screw conveyors is connected.

The discharging outlet is generally opened in the bottom portion of the tank. There is also a case where this outlet is opened either in a side wall near the bottom portion or in a periphery of the bottom. At the discharging outlet there can be set such as a discharge-controlling or partitioning valve, or a constant-quantity-supplying device, for the purpose of controlling the discharge of the powder.

It is also possible that the tank includes a ventilating system for discharging air from the tank, or a vibrating mechanism for vibrating the tank to prevent the powder from clogging or adhering. A system for heating or cooling the powder is also available.

The powder surface detector is provided to the top of the tank or to a side near the top. Of the powder surface detector, the float and a part of the hanging line are placed in the inner space of the tank. Also in the case where a guide cylinder is set, it is set inside the tank. The limit switch can be set outside the tank. For the purpose of preventing the powder from entering an acting portion of the limit switch, it is preferable to set the limit switch outside the tank. The inspection and exchange of the limit switch are also easy. In the case where the hanging line penetrates an outer wall of the tank, a cover can be provided around the hanging line in order for the powder not to leak out of this penetrated portion.

Where the powder surface detector is placed is preferably a position where the level position of the powder surface in the whole of the tank can representatively be indicated, or a position which is hardly influenced by a powder flow or airflow as supplied from the supplying inlet. For example, it is possible that: on the top of the tank, pneumatic transportation piping which is to be the supplying inlet is connected to the periphery of one end in a diametrical direction, and the powder surface detector is set in the periphery of the other end.

It is also possible that one hopper for storing the superfine powder is provided with at least two powder surface detectors. If there is a detection output even from a powder surface detector, as put in any one place, of the at least two powder surface detectors, then the supply of the powder can be stopped. Or the supply of the powder may be stopped after obtaining detection outputs either from all the powder surface detectors or from not fewer than predetermined places.

If at least two powder surface detectors different in setting of the detection height are combined together, it is also possible to obtain detailed information about the level position of the powder surface from which powder surface detector gives a detection output.

Each Step of Production Line of Water-Absorbent Resin Powder

The water-absorbent resins are generally obtained by a process including the steps of: polymerizing a monomer solution; and, if necessary, drying the resultant polymer; and pulverizing the resultant polymer before and/or after the drying step. Among them, water-absorbent resins containing an acid group, and further, one or mixtures of those which have a carboxyl group and are carboxylic acids or their salts, are favorable, and it is typical that the water-absorbent resin comprises a polymer as a major component wherein the polymer is a polymer obtained by a process including the steps of: polymerizing monomers including acrylic acid and/or its salt (neutralized product) as a main component; and then crosslinking the resultant polymer; namely, a crosslinked polymer of poly(acrylic acid salts), if necessary, containing a graft component.

(Polymerizing step):

Examples of the above acrylic acid salts include: acrylic acid salts of alkaline metals, such as sodium, potassium, and lithium; and ammonium salts and amine salts of acrylic acid. The neutralization ratio of the acid group (mol % of neutralized acid group) is favorably in the range of 30 to 100 mol %, more favorably 50 to 90 mol %. The neutralization of the water-absorbent resin may be carried out in a state of a monomer before the polymerization, or in a state of a polymer during or after the polymerization, or in their combinations with each other.

The monomer to obtain the water-absorbent resin as used in the present invention may further comprise monomers other than the above acrylic acid (salt) when the occasion demands. When the monomers other than the acrylic acid (salt) are used, the ratio of these monomers other than the acrylic acid (salt) is favorably not more than 30 mol %, more favorably not more than 10 mol %, relative to the total with the acrylic acid and/or its salt used as the major components.

There is no especial limitation on the monomers other than the acrylic acid (salt), but specific examples of the above other monomers include: anionic unsaturated monomers, such as 2-(meth)acrylamido-2-methylpropanesulfonic acid, 2-(meth)acryloylethanesulfonic acid, and 2-(meth)acryloylpropanesulfonic acid, and their salts; nonionic hydrophilic-group-containing unsaturated monomers, such as (meth)acrylamide, N,N-dimethyl(meth)acrylamide, 2-hydroxyethyl (meth)acrylate, and N-vinylpyrrolidone; and cationic unsaturated monomers, such as N,N-dimethylaminoethyl (meth)acrylate and quaternary salts thereof.

The water-absorbent resin may be a type of self-crosslinking without using any crosslinking agent, but it is more favorably obtained by copolymerizing or reacting with crosslinking agents (internal-crosslinking agents for water-absorbent resins) having at least two polymerizable unsaturated groups or at least two reactive groups per molecule.

Specific examples of these internal-crosslinking agents include: N,N'-methylenebis(meth)acrylamide, (poly)ethylene glycol di(meth)acrylate, (poly)propylene glycol di(meth)acrylate, (ethylene-oxide-modified) trimethylolpropane tri(meth)acrylate, and glycerol. These internal-crosslinking agents are used in the range of favorably 0.001 to 2 mol %, more favorably 0.005 to 0.5 mol %, still more favorably 0.01 to 0.2 mol %, particularly favorably 0.03 to 0.15 mol %.

When the crosslinked structure is introduced into the internal portion of the polymer by using the internal-crosslinking agent, the above internal-crosslinking agent may be added to the reaction system before, during or after polymerization of the above monomers, or after neutralization.

The water-absorbent resin as obtained by the process according to the present invention contains repeated units comprising the above monomer (and crosslinking agent as used if necessary), and may further contain grafted chains.

When the above polymerization is carried out, to the reaction system there may be added the following materials: hydrophilic polymers, such as starch, cellulose, derivatives from starch, derivatives from cellulose; polyvinyl alcohol, polyacrylic acid (salts), and crosslinked products of polyacrylic acid (salts), in a quantity of 0 to 50 mass % (relative to the monomers), favorably 05 mass % (relative to the monomers); or various foaming agents, such as (hydrogen) carbonate salts, carbon dioxide, azo compounds, and inert organic solvents; precipitates; various surfactants; chelating agents; and chain transfer agents such as hypophosphorous acid (salts); in a quantity of not larger than 10 mass % (relative to the monomers).

When the above-mentioned monomers are polymerized, bulk polymerization or precipitation polymerization can be carried out. However, from the viewpoint of the performance or the easiness of controlling the polymerization and further the absorption properties of swollen gels, aqueous solution polymerization or reversed-phase suspension polymerization is favorably carried out using the above monomers in the form of their aqueous solution, and particularly the aqueous solution polymerization is favorable. Favorable examples of the aqueous solution polymerization include: a method that involves the step of polymerizing the aqueous monomer solution in a double-arm type kneader while the resultant hydrogel is pulverized; and a method that involves the steps of supplying the aqueous monomer solution into a predetermined vessel or onto a moving belt to polymerize the monomer, and pulverizing the resultant gel with such as a meat chopper.

When the above monomers are used in the form of their aqueous solution, their concentration in the aqueous solution (hereinafter referred to as aqueous monomer solution) depends upon the temperature of the aqueous solution or upon the monomers, and is therefore not especially limited. However, the concentration is favorably in the range of 10 to 70 mass %, more favorably 20 to 60 mass %. When the above aqueous solution polymerization is carried out, solvents other than water may be jointly used when the occasion demands, and there is no limitation on the kinds of the solvents as jointly used.

When the above polymerization is initiated, the following polymerization initiators, for example, can be used: radical polymerization initiators, such as potassium persulfate, ammonium persulfate, sodium persulfate, t-butyl hydroperoxide, hydrogen peroxide, and 2,2'-azobis(2-amidinopropane) dihydrochloride; and photopolymerization initiators such as 2-hydroxy-2-methyl-1-phenyl-propan-1-one. Redox initiators are also available by further using a reductant jointly therewith to combine both, if necessary. Examples of the above reductant include: (bi)sulfurous acid (or its salts) such as sodium sulfite and sodium hydrogensulfite; L-ascorbic acid (or its salts); reducible metals (or their salts) such as ferrous salts; and amines. However, there is no especial limitation on the reductants. The quantity of these polymerization initiators as used is in the range of usually 0.001 to 2 mol %, favorably 0.01 to 0.1 mol %.

The polymerization reaction may be initiated by irradiating the reaction system with active energy rays, such as radiations, electron beams, and ultraviolet rays, or further using the above polymerization initiators jointly therewith. Incidentally, the reaction temperature is not especially limited in the above polymerization reaction, but it is favorably in the range of 15 to 130° C., more favorably 20 to 120° C. In addition, there is no especial limitation on the reaction time and polymerization pressure either, and they may fitly be determined according to factors such as the respective kinds of the monomers and polymerization initiators and the reaction temperature.

(Drying Step):

When the aforementioned crosslinked polymer is a gel as obtained by the aqueous solution polymerization, namely, a crosslinked hydrogel polymer, the crosslinked polymer is dried, if necessary, and usually pulverized before and/or after the drying, thus producing a water-absorbent resin. In addition, the drying is carried out in the temperature range of usually 60 to 250° C., favorably 100 to 220° C., more favorably 120 to 200° C. The drying time depends upon the surface area and water content of the polymer, and the kinds of dryers, and is selected in such a way as to give the aimed water content.

The water content (as defined by a water content in the water-absorbent resin and measured by the weight loss on drying at 180° C. for 3 hours) of the water-absorbent resin usable in the present invention is not especially limited. However, the water-absorbent resin is a powder exhibiting fluidity even at room temperature from the viewpoint of properties of the resultant water-absorbing agent, and it is in a powdery state where the water content is more favorably in the range of 0.2 to 30 mass %, still more favorably 0.3 to 15 mass %, particularly favorably 0.5 to 10 mass %.

(Pulverizing Step and Classifying Step):

As to the water-absorbent resin powder, there is a case where an undried and unpulverized gel, that is, such as has an average particle diameter of larger than 1,000 μm, can also be used. In general, however, it is used in the form of a powder.

The above gel is arranged by drying, pulverizing, and classifying it so as to have a powder particle diameter which meets the purpose.

The particle shape of the water-absorbent resin as obtained in this way is such as spherical, pulverized, or irregular shape and not especially limited. However, a water-absorbent resin having irregular pulverized shape as obtained through the pulverizing step can favorably be used.

(Surface-Modifying Step):

In the present invention, the water-absorbent resin as polymerized, dried, pulverized, and classified in the above ways is further surface-modified.

Examples of the surface modification of the water-absorbent resin powder include: (i) surface-crosslinking with surface-crosslinking agents; (ii) surface-coating with water-insoluble fine particles; (iii) surface-coating with surfactants; (iv) surface-coating with hydrophilic or hydrophobic polymers; (v) surface-coating with antibacterial agents or deodorants; and (vi) surface-coating with hydrophilic or hydrophobic organic compounds. These may be used either alone respectively or in combinations with each other. Favorable are (i) surface-crosslinking and/or (ii) surface-coating with water-insoluble fine particles, and the most favorable is the joint use of (i) and (ii).

Surface Modification by Surface-Crosslinking

From the viewpoint of properties, the quantity of the surface-modifying agent (e.g. surface-crosslinking agents, water-insoluble fine particles) as used is in the range of 0.001 to 10 mass parts, favorably 0.01 to 8 mass parts, more favorably 0.05 to 5 mass parts, most favorably 0.1 to 2 mass parts, per 100 mass parts of the water-absorbent resin.

The surface-crosslinking is an operation for rendering the crosslinking density in the vicinity of surfaces of the water-absorbent resin particles higher than that inside the particles, thereby improving the properties, and various surface-crosslinking agents (corresponding to second crosslinking agents relative to the internal-crosslinking agents) are added to the water-absorbent resin powder, thereby crosslinking only its surfaces.

Although not especially limited, as the surface-crosslinking agent there is used a dehydration-reactable crosslinking agent favorably in respect to the greatness of the effect of using the hopper as intended in the present invention. Herein, the term "dehydration-reactable" means that the functional group of the water-absorbent resin (especially, the functional group in the surface neighborhood) runs a dehydration reaction, favorably a dehydration esterification and/or dehydration amidation, more favorably a dehydration esterification, with the crosslinking agent.

Specifically, when the water-absorbent resin contains a carboxyl group, examples of the surface-crosslinking agent running such a dehydration reaction include: hydroxyl-group-containing crosslinking agents such as polyhydric alcohols; amino-group-containing crosslinking agents such as polyamines; and further, cyclic crosslinking agents, such as alkylene carbonates, mono-, di-, or polyoxazolidinone compounds, and oxetane compounds (e.g. 3-methyl-3-oxetane methanol) wherein hydroxyl groups or amino groups are formed in the accompaniment with a ring-opening reaction of the cyclic crosslinking agents and run a crosslinking reaction.

Still more specific examples of the dehydration-reactable crosslinking agent include: polyhydric alcohol compounds, such as propylene glycol, 1,3-propanediol, 2-methyl-1,3-propanediol, glycerol, 1,4-butanediol, and 1,5-pentanediol; alkylene carbonate compounds, such as 1,3-dioxolan-2-one and 4-methyl-1,3-dioxolan-2-one; oxetane compounds, such as 3-methyl-3-oxetane methanol; and polyoxetane compounds. Of these, at least one member selected from the group consisting of the polyhydric alcohols, alkylene carbonates, oxazolidinone compounds, and (poly)oxetane compounds is favorable for displaying the effects of the present invention to the utmost, and the polyhydric alcohols are most favorably used.

Besides these dehydration-reactable crosslinking agents, examples of the surface-crosslinking agent further include non-dehydration-reactable crosslinking agents, specifically, the following: epoxy compounds such as ethylene glycol diglycidyl ether and y-glycidoxypropyltrimethoxysilane; polyisocyanate compounds, such as 2,4-tolylene diisocyanate; polyoxazoline compounds, such as 1,2-ethylenebisoxazoline; silane coupling agents, such as γ-aminopropyltrimethoxysilane; polyaziridine compounds, such as 2,2-bishydroxymethylbutanol-tris[3-(1-aziridinyl) propionate]; and polyvalent metals, such as beryllium, magnesium, calcium, strontium, zinc, aluminum, iron, chromium, manganese, titanium, and zirconium.

When the water-absorbent resin powder is blended with the surface-crosslinking agent, water and/or a hydrophilic organic solvent may be used.

The quantity of water as used is in the range of 0.1 to 10 parts by mass, favorably 0.5 to 8 parts by mass, more favorably 1 to 5 parts by mass, per 100 parts by mass of the water-absorbent resin powder.

Examples of the hydrophilic organic solvent include: alcohols, such as ethyl alcohol, propyl alcohol, and isopropyl alcohol; ketones, such as acetone; ethers, such as dioxane, alkoxy(poly)ethylene glycol, and tetrahydrofuran; amides, such as caprolactam; and sulfoxides, such as dimethyl sulfoxide. The quantity of the hydrophilic organic solvent as used is in the range of 0 to 10 parts by mass, favorably 0 to 5 parts by mass, more favorably 0 to 3 parts by mass, per 100 pars by mass of the water-absorbent resin.

The method for blending the surface-crosslinking agent is not especially limited. Accordingly, such as water, the hydrophilic organic solvent, and the inorganic powder may be blended to the water-absorbent resin powder separately, or in a lump, or several divided times. However, it is favorable that: these are all beforehand blended together, and thereafter the resultant mixture is added to the water-absorbent resin. In such a case, it is more favorable that the above mixture is beforehand formed into an aqueous solution.

When the blending is carried out, water-insoluble fine particle powders or surfactants may coexist in such a range as not to hinder the effects of the present invention.

Favorable of the above various blending methods is a method which involves blending by dropwise adding, more favorably, spraying, the surface-crosslinking agent and further, if necessary; water and/or the hydrophilic organic solvent, to the water-absorbent resin powder. The size of the liquid drop as sprayed is favorably not larger than 300 μm, more favorably not larger than 200 μm. In such a case, the temperature of the aqueous solution is in the range of 0° C. to its boiling point, favorably 5 to 50° C., more favorably 10 to 30° C., from the viewpoint of blendability and stability. The temperature of the water-absorbent resin powder is, before the blending, favorably in the range of 0 to 80° C., more favorably 40 to 70° C., from the viewpoint of blendability.

A favorable blending apparatus as used for the aforementioned blending is an apparatus which is able to produce great blending power in order to surely carry out uniform blending. Examples of such a blending apparatus include cylinder type blenders, double-wall cone type blenders, high-speed-stirring type blenders, V-character-shaped blenders, ribbon type blenders, screw type blenders, fluidized-type furnace rotary disk type blenders, air blow type blenders, twin-arm type kneaders, internal blenders, pulverizing type kneaders, rotary blenders, and screw type extruders.

When the heat treatment is carried out in this step, the treating time is favorably in the range of 1 to 180 minutes, more favorably in the range of 3 to 120 minutes, most favorably in the range of 5 to 100 minutes. The heat-treating temperature (as defined by the heat medium temperature or material temperature) is favorably in the range of 100 to 250° C., more favorably 140 to 220° C., still more favorably 150 to 230° C., most favorably 160 to 220° C.

The heat treatment can be carried out with conventional dryers or heating furnaces. Examples thereof include channel type blending dryers, rotary dryers, disk dryers, fluidized-bed dryers, air blow type dryers, and infrared dryers.

Other Surface Modifications

In the surface modification as used in the process according to the present invention, such as inert surfactants, inert deodorants, or inert inorganic fine particle powders may be used in addition to the surface-crosslinking or without causing the surface-crosslinking, wherein the "inert" means substantially not reacting with the water-absorbent resin. As the surfactants and the inert inorganic fine particle powders as used in such a case, there are favorably used such as the below-mentioned superfine particles and inorganic fine particles, and favorably on that occasion, the surface-crosslinking is also carried out at the same time or separately.

The cationic polymer compound as an additive used for the surface modification of the water-absorbent resin powder in the present invention can improve such as fixability of the water-absorbing agent to sanitary materials, and favorably has a mass-average molecular weight of not smaller than 2,000, more favorably not smaller than 5,000, most favorably not smaller than 10,000. The quantity of the cationic polymer compound as used is favorably in the range of 0.01 to 10 parts by mass, more favorably 0.05 to 5 parts by mass, still more favorably 0.1 to 3 parts by mass, per 100 parts by mass of the water-absorbent resin. The blending of the cationic polymer compound is carried out by adding it alone or in a form of a solution (an aqueous solution), favorably, after the surface-crosslinking. Specific examples of the cationic polymer compound include polyethylenimine, polyvinylamine, polyallylamine, condensed products of polyamidamine and epichlorohydrin, polyamidine, partially hydrolyzed products of poly(N-vinylformaldehyde), or their salts.

In the present invention, if the water-insoluble fine particles are used as an additive used for the surface modification, then the liquid permeability of the water-absorbent resin powder and its blocking resistance when absorbing moisture can further be improved. As the water-insoluble fine particles, there are used inorganic or organic water-insoluble fine particles having a size of favorably not larger than 10 μm, more favorably not larger than 1 μm, particularly favorably not larger than 0.1 μm. Specific examples thereof include silicon oxide (trade name: Areosil produced by Nippon Aerosil Co., Ltd.), titanium oxide, and aluminum oxide. The blending is carried out by powder-blending (dry-blending) or slurry-blending, and the quantity as used then is favorably in the range of not larger than 10 parts by mass, more favorably 0.001 to 5 parts by mass, still more favorably 0.01 to 2 parts by mass, per 100 parts by mass of the water-absorbing agent powder.

The present invention may further comprise an adding step for giving various functions to the water-absorbent resin separately from the surface modification or as the surface modification, if necessary, such as a step of adding materials such as deodorants, antimicrobial agents, perfumes, foaming agents, pigments, dyes, hydrophilic short fibers, plasticizers, pressure-sensitive adhesives, surfactants, manure, oxidants, reductants, water, salts, chelating agents, disinfectants, hydrophilic polymers such as polyethylene glycols and polyethylenimine, hydrophobic polymers such as paraffin, thermoplastic resins such as polyethylene and polypropylene, and thermosetting resins such as polyester resins and urea resins. The quantity of these additives as used is in the range of 0 to 10 mass, favorably 0 to 1 part by mass, per 100 parts by mass of the water-absorbent resin powder.

(Conveying Steps):

The continuous production process for a water-absorbent resin powder, according to the present invention, after pulverizing the dried product of the crosslinked hydrogel polymer, includes steps of continuously conveying the resultant powder of the above dried product with such as a transporting machine.

Examples of the transporting machine, as used in the above continuous conveying steps, include: belt conveyors, screw conveyors, chain conveyors, vibratory conveyors, and pneumatic conveyors; and transporting machines as provided with a means of heating and/or heat-retaining their inner surfaces from outside. Of these transporting machines, the chain conveyors or pneumatic conveyors are preferable.

As to the above continuous conveying steps, it is preferable that at least a part of them are carried out by pneumatic transportation. Also for the purpose of decreasing the damage as given by transportation to the dried product powder, namely, water-absorbent resin powder having high properties, and further for the purpose of preventing a metallic foreign substance from mingling, it is preferable that a part of the continuous conveying steps are carried out by pneumatic transportation.

As to the continuous conveying steps, it is preferable that the inner surfaces of the transporting machine are put in a state heated and/or heat-retained from outside, because, in such a state, it tends to be possible to effectively prevent agglomeration in the transporting machine.

Novel Powder Surface Detector

Such as the constant-quantity-supplying hopper usually has a powder-supplying inlet in an upper portion of a cylindrical tank, and further has a discharging outlet in a lower portion of the tank. The powder, which has been supplied from the supplying inlet to the tank by a transporting means such as pneumatic transportation, accumulates in the tank. When the accumulated powder is used, the discharging outlet is opened to get a necessary quantity of powder out. When the powder is supplied from the supplying inlet to the tank by such as pneumatic transportation, the powder overflows the tank unless the supply of the powder is stopped in a stage when a predetermined quantity of powder has accumulated in the tank.

What thus becomes necessary is a detecting means for detecting the reach of the quantity of the accumulated powder in the tank to a predetermined limit. However, in the case where supplied to the hopper by the aforementioned pneumatic transportation, the powder is supplied in a state floating in a large quantity of air, and is still in a state floating or being stiffed up in air after having been supplied to the tank, therefore there are problems in that the quantity of the powder in the tank or the powder surface is difficult to precisely measure. Particularly in the case where a superfine powder having an average particle diameter of not larger than 1 $\mu$m (favorably not larger than 50 nm) and a bulk density of not larger than 600 g/L (favorably in the range of 1 to 500 g/L, more favorably in the range of 10 to 300 g/L) is handled, the above problems become more serious, therefore it is difficult to precisely know the powder surface in the hopper. As a use in which such a superfine powder is handled, there is a production process for water-absorbent resin particles including the treating step of attaching a superfine powder to water-absorbent resin particles. The hopper (a) in the present invention makes it possible to precisely and easily detect the quantity of the accumulated powder, specifically, the surface position of the powder, that is, powder surface, when the aforementioned powder, particularly, superfine powder, is accumulated in such as tank of the hopper.

The powder surface detector, according to the present invention, is a device for detecting a powder surface rising when accumulating a powder, and comprises:

a float which is supported movably up and down above the powder surface and of which the bottom contacts the powder surface when the powder surface has risen;

a hanging line for hanging down the float to support it movably up and down;

a limit switch having a mover which serves for supporting the hanging line and is moved by a change of the weight, as applied through the hanging line, of the float.

When a powder, particularly, the superfine powder having extremely fine particle diameters, is utilized for various industrial uses, a constant-quantity-supplying hopper is conventionally used. What becomes necessary is a detecting means for detecting the reach of the quantity of an accumulated powder in a tank to a predetermined limit. However, in the case where the powder is supplied as a raw material of water-absorbent resin to the hopper by the aforementioned pneumatic transportation, the powder is supplied in a state floating in a large quantity of air, and is still in a state floating or being stirred up in air after having been supplied to the tank, therefore there are problems in that the quantity of the powder in the tank or the powder surface is difficult to precisely measure.

The powder being in a state floating in air does not add to the mass of the tank. Therefore, even if the mass of the tank is measured, the quantity of the stored powder cannot accurately be known. In a state where the powder is floating in air, a sound wave or light cannot accurately be reflected from the powder surface, and it is therefore difficult to detect the powder surface by the sound wave or light.

The powder surface detector is used by being provided to an instrument or apparatus which needs to know the level position of the surface of an accumulated powder, that is, powder surface, when a powder is stored or put in the custody in an accumulated state.

The powder surface detector is utilized for a use which needs to restrict the level of the powder surface, rising when accumulating a powder, to a predetermined limit.

Examples of the apparatus for storing a powder include hopper apparatuses, quantifying apparatuses, mixingstirring apparatuses, storing apparatuses, transporting containers, and transporting cars in production lines of various chemical products.

The novel powder surface detector according to the present invention, as explained in detail below, has been developed for the purpose of coping with the above cases, and is a detector provided to a tank for storing an additive powder as a superfine powder in order to detect a powder surface rising when accumulating the powder in the tank, and comprises:

a float which is supported movably up and down above the powder surface and of which the bottom contacts the powder surface when the powder surface has risen;

a hanging line for hanging down the float to support it movably up and down;

a limit switch having a mover which serves for supporting the hanging line and is moved by a change of the weight, as applied through the hanging line, of the float.

Hereinafter, each component thereof is explained in detail.

[Float, Favorably, Float Board]:

The float has a function of detecting the level position of the powder surface by being lifted by the powder due to contact of the powder surface, rising when accumulating the powder, with the bottom of the float. That is to say, a float part which is floated by the powder is used.

It is favorable that the float is made of a material which is so lightweight as to easily be lifted by the powder, because such a float is able to sensitively detect the powder surface rising. However, the float needs to have a mass enough for a change of its weight to cause the mover of the limit switch to make a switching action. The float is required not to recklessly be floated up or tilted by influence of airflow in the peripheral environment.

The shape of the float (favorably, float board) is fitly determined also by the sort of the powder or the size or shape of the hopper, but available is, for example, a float having a mass per unit area contacting the powder surface in the range of about 0.000001 to about 0.2 $g/mm^2$, favorably about 0.00001 to about 0.002 $g/mm^2$, particularly favorably about 0.0001 to about 0.0002 $g/mm^2$, or a mass as that of one float in the range of 0.3 to 400 g, favorably 0.3 to 40 g, particularly favorably 3 to 4 g, or a thickness of the float in the range of 0.07 to 800 mm, favorably 0.7 to 80 mm, particularly favorably 7 to 8 mm, or an area in the range of 20 to 3,000 cm2, favorably 200 to 300 cm2.

Favorable is a material which is difficult to cause the adhesion of the powder to the surface of the float, or to deteriorate or degrade due to contact with the powder.

A foamed board of synthetic resin such as polystyrene is usable as a specific material of the float.

The shape of the float can arbitrarily be set if it can surely detect the powder surface rising. In the case where the guide cylinder, the shape needs to be set to get in the inner shape of the guide cylinder. Specific examples of adoptable shapes include the shape of a rectangle, polygon, or circle.

The float is usually the shape of a flat board, but may have such as unevenness, bending, curvature, a hole, or a channel in the range not interfering with the aimed function.

[Hanging Line]:

It is enough that the hanging line has a strength to such a degree that it can hang down the float to support it. A hanging line having a light mass per unit length is favorable for sensitizing the action of the limit switch. Favorable is a hanging line which is so flexible and so softly changeable in shape that the total mass of a super-lightweight float and the hanging line can efficiently be converted into force to work the mover of the limit switch. Available is, for example, a hanging line having an outer diameter in the range of 0.5 to 2.0 mm and a specific gravity in the range of 0.002 to 0.008 (g/ml).

However, even a line material which is so rigid as to be difficult to change its shape is available if the mover and the support or posture of the hanging line and the float can accurately be set for the load to accurately be transmitted. Favorable is a hanging line which has strength and durability so as to be difficult to wear out by contact friction with the powder.

Thread materials such as synthetic resins (e.g. nylon) are available as specific materials of the hanging line. Wires and glass lines are also available. Kevlar (trademark of E. I. Du Pont DE NEMOURS & Co., Ltd.) thread is a strong and favorable material.

If the hanging line is provided just to the gravity center position of the float, the float can be supported in a horizontal state with good balance by one point, and further the structure is simplified. It is also possible to support the float by providing the hanging line to at least two places, for example, three places, apart from the center of the float. The at least two hanging lines can be tied up in a bundle above the float. It is also possible to connect the at least two hanging lines to another hanging line, as provided to the limit switch, above the float.

[Limit Switch]:

There is no especial limitation with regard to the internal mechanism or the action principle of the switch if an electrical switching action can be achieved by movement of the float and the hanging line which accompany the rise of the powder surface.

The switching action is made in at least two states as follows: a state where the powder surface has not yet reached a predetermined height; and a state where the powder surface has reached the predetermined height.

The action of the mover to switch the electric contact is generally a gyrating movement around an end as a base point, but also includes a linear movement in an axial direction and a rotary movement around an axis.

Because the mass of the hanging line and that of the float acts in a direction of the gravity, that is, in a vertical direction, a mover of which the portion where the hanging line is provided moves in a vertical direction to make the switching action has a simple structure and can surely make the action. However, if a mechanism to convert a movement direction is put between the hanging line and the mover or if the direction of the hanging line is changed along a pulley or guide and then connected to the mover, the direction in which the mover acts may be different from the gravity direction.

The output of the limit switch can be arranged in such a manner that its information can be communicated as electric signals to various indicators or controllers through such as communication lines. Such as mode or intensity of the output signals can fitly be set.

[Action of Powder Surface Detector]:

The powder surface detector is placed above the powder surface of the powder getting accumulated.

The powder surface, which has risen by the accumulation of the powder, contacts the bottom of the float to support it. The gravity, that is, weight, of the super-lightweight float, as applied from the float to the hanging line, is decreased.

As a result, the acting force, as applied from the hanging line to the mover of the limit switch, is changed. By this change of the acting force, the mover acts to electrically switch the limit switch.

The electric output of the limit switch lights an indicating lamp, or buzzes, or indicates a character on a monitor display, thereby informing an administrator that the powder surface has become high to a predetermined position.

The administrator can control the powder-supplying system to stop the accumulation of the powder. It is also possible that, in place of such a manual operation, a computer or automatic controlling system is used to automatically stop the action of the powder-supplying system by the output from the powder surface detector.

Also possible is more complex control such that: the powder surface detector is set in at least two places with the level position of the powder surface changed, and if a powder surface detector as set in a lower position acts, the quantity of the powder being supplied is rendered small, and further, if a powder surface detector as set in a higher position acts, the supply of the powder is entirely stopped. Also possible is an action such that, if a powder surface detector as set in a lower position comes not to detect the powder surface, additional supply of the powder is started.

[Guide Cylinder]:

In order that the float can accurately detect the powder surface rising, the guide cylinder has a function of protecting the float to prevent the float from making an incorrect action or becoming unable to act.

The guide cylinder is set to surround the outside of the float. The guide cylinder is made not to contact the super-lightweight float and thereby made not to hinder a sensitive action of the float. It is favorable that the guide cylinder is set to surely surround the float throughout the whole range in which the super-lightweight float moves up and down. The guide cylinder is placed in such a way that a peripheral airflow, having a possibility of rocking or tilting the float, will not blow the float to cause an incorrect action. It is favorable that the guide cylinder is set to prevent the powder from accumulating from the periphery of the float onto the top of the float.

As to the material of the guide cylinder, it is enough that the above airflow or powder can be cut off, and structural materials such as synthetic resins, metals, and glass are available.

The upper and lower ends of the guide cylinder is opened to a space outside the guide cylinder. As a result, a powder floating in air exists almost equally outside and inside the guide cylinder, and it is possible to prevent a great gap from occurring between a powder surface in the periphery of the float inside the guide cylinder and a powder surface outside the guide cylinder.

As the shape of the guide cylinder, there can be adopted cylindrical shapes of such as a cylinder and an angular cylinder.

[Rise-Restricting Part]:

When the powder surface contacts the float as hung down by the hanging line, the float rises together with the rise of the powder surface. If the float rises too much, it becomes easy that there occur problems in that the float projects from the upper end of the guide cylinder to tilt by influence of an outer airflow, or gets out of the guide cylinder. There also occur troubles that the hanging line, as loosened by the rise of the float, tangles or twists.

Effective to solve such problems is a rise-restricting part which inhibits the float from rising beyond a predetermined position.

As the rise-restricting part, there can be set a member which physically contacts the float to inhibit it from further rising when the float has risen. For example, the inside of the guide cylinder can be provided with a projection, or a thin line material can be strained so as to cross the guide cylinder. The member, composing the rise-restricting part, is favorably set in the shape or disposition which does not hinder the rise of the powder surface inside the guide cylinder or the powder-surface-detecting action of the float.

As the rise-restricting part, a restricting line can be provided to the float. The same material as that for the aforementioned hanging line can be used for the restricting line, which is favorably made of a material that is light-weight and has soft changeability in shape. An end of the restricting line is connected to a portion, for example, bottom, of the float, and the other end of the restricting line is connected to a fixed structure, such as guide cylinder, which does not move together with the float.

If the super-lightweight float rises to extend the restricting line to the utmost, the float is inhibited from further rising. The restricting line is placed in a back space of the float, and therefore little has a bad effect on such as the action of the float or the change or movement of the powder surface as caused by the accumulation of the powder.

[Air-Spouting Means]:

If the powder accumulates on the top of the float, the weight as loaded to the hanging line increases. If there is the powder accumulated in a large quantity on the float even if the float gets on the powder surface to decrease the mass of the float, the acting force as applied from the hanging line to the mover of the limit switch does not sufficiently decrease, or it takes time to cause the mover to make the switching action.

What is thus effective is the air-spouting means for removing the powder as accumulated on the float.

As to the air-spouting means, its air-spouting outlet or nozzle is placed in a position where the powder as accumulated on the float can efficiently be blown off. Usually, if air is allowed to blow the outer periphery of one end of the float obliquely downward, then the airflow spreads over the surface of the float, whereby the powder as accumulated on the whole surface can be removed. It is also possible to set the air-spouting outlet in at least two places.

If the removal of the powder from the float is carried out by the air-spouting means, the powder can efficiently be eliminated, and further it is possible to also prevent needless external force from being applied to the float, or the float from being damaged, when compared with cases where the powder is removed by sweeping up the powder with such as a brush or plate.

Hereinafter, a working example of the above powder surface detector according to the present invention is explained in detail while referring to the drawings.

Figure 4:
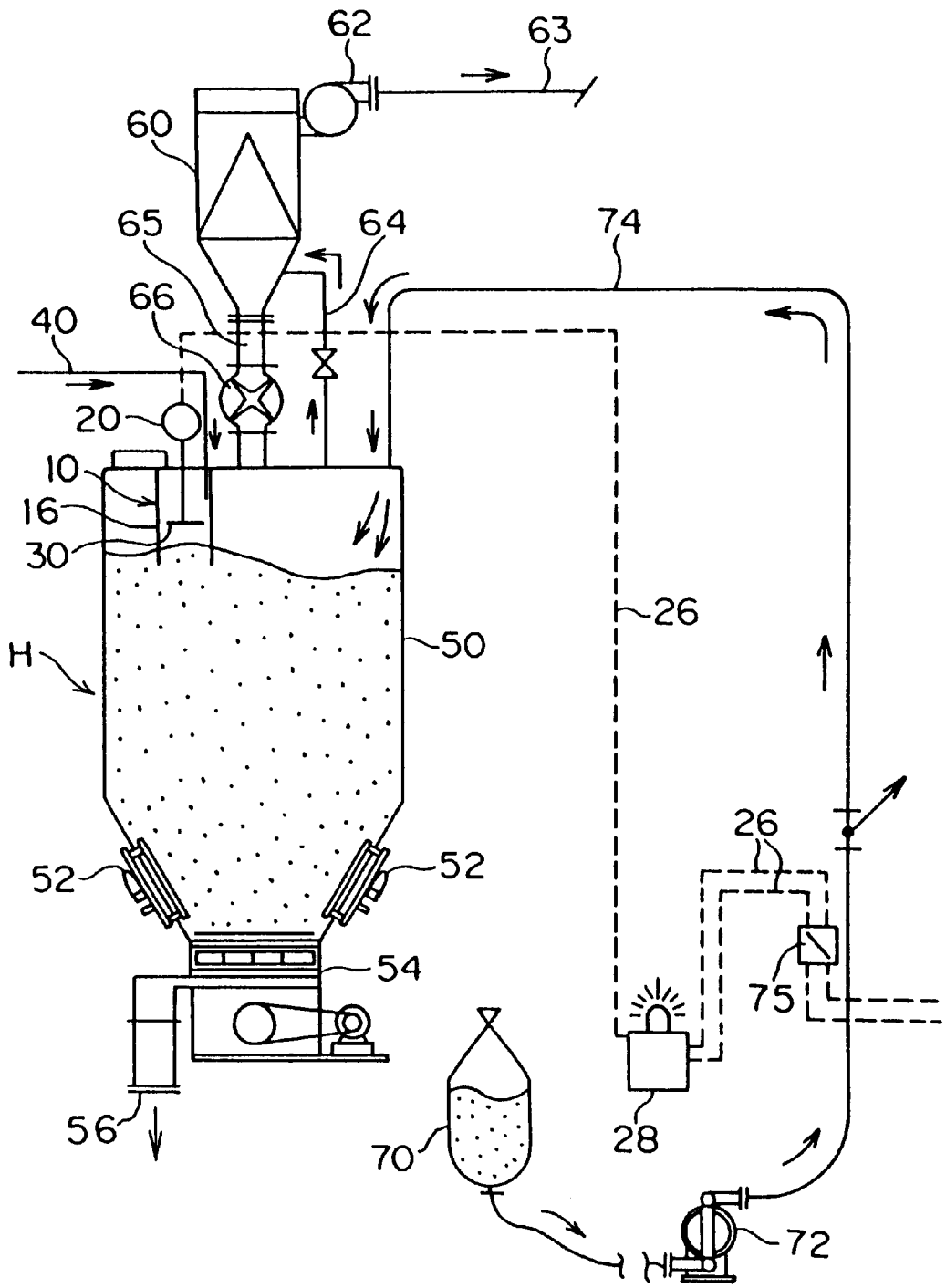
FIG. 4 is a figure of the whole structure of a superfine-powder-storing hopper as provided with the powder surface detector.

The powder surface detector, as shown in FIG. 3, is used in a state provided to such as the hopper as illustrated in FIG. 4.

As is shown in FIG. 3, the powder surface detector 10 has a float 30, a hanging line 32, and a limit switch 20.

The float 30 is made of a extremely-lightweight rectangular thin board such as foamed polystyrene board. Specifically, a float 30 having a thickness of 8 mm, an area of 28,900 mm$^2$, and a mass of 4 g is usable.

The hanging line 32 is made of a soft flexible Kevlar thread having a thickness of 1 mm, and its lower end is fixed in the center of the top of the float 30. The upper end of the hanging line 32 penetrates the center of a supporting board material 12 of the powder surface detector 10 to extend upward. The supporting board material 12 is fixed to such as hopper. There is also a case where a structure itself such as ceiling wall of hopper serves as the supporting board material 12.

The limit switch 20 is placed at the upper end of a connecting cylinder 23 as set in the upward center of the supporting board material 12. The limit switch 20 makes actions of switching on and off the electric contact by upward and downward gyrating movements of a built-in mover 24 in a vertical plane. Specifically, the output signal of a communicating line 26 as connected to the limit switch 20 is switched between a state where the tip of the mover 24 has gyrated downward and a state where the tip of the mover 24 has gyrated upward. Although drawing is omitted, the mover 24 is stressed upward by a stressing means such as spring.

To the communicating line 26, there is connected an indicating lamp 28. In a state where the mover 24 of the limit switch 20 is oriented downward, the indicating lamp 28 does not light up, and in a state where the mover 24 is oriented upward, the indicating lamp 28 lights up.

The aforementioned hanging line 32 extends from the center of the supporting board material 12 through the inside of the connecting cylinder 23 into the limit switch 20, and then the upper end of the hanging line 32 is connected to the tip of the mover 24. To the mover 24, there are downward applied the mass of the hanging line 32 and that of the float 30 through the hanging line 32. The acting force by the weights of the hanging line 32 and the float 30 is greater than the stress as applied to the mover 24. As a result, therefore, the mover 24 is in a downward gyrated state. In this state, the indicating lamp 28 does not light up.

A cylindrical guide cylinder 16 is placed so as to surround the outside of the float 30. The guide cylinder 16 surrounds the periphery of the float 30 across the range wider than that in which the float 30 moves in upward and downward directions. In the range where the guide cylinder 16 exists, an external airflow or a powder can be prevented from directly blowing from outside the guide cylinder 16 to the float 30 inside the guide cylinder 16.

The upper end of the guide cylinder 16 is supported by the supporting board material 12 through a supporting arm 14 of the shape of a thin bar. In a space above the guide cylinder 16, air and a powder can freely flow through inside and outside the guide cylinder 16 except the portion as the supporting arm 14.

In the center of the bottom of the float 30, there is fixed one end of a rise-restricting line 34. The rise-restricting line 34 is made of the same material as of the hanging line 32. The other end of the rise-restricting line 34 is fixed in the center of a thin-bar-shaped fixed axis 18 as laid in a diametrical direction across the lower end of the guide cylinder 16.

The rise-restricting line 34 is set to be longer than the distance between the float 30, being in a state hung down by the hanging line 32, and the fixed axis 18, and is placed in a state being loose a little and able to afford its length. If the float 30 is moved upward, the rise-restricting line 34 is stretched to become unable to afford its length. Therefore, the float 30 cannot rise beyond the rising position as determined by the length of the rise-restricting line 34.

An air nozzle 42 is placed sideward above the float 30 as hung down by the hanging line 32. To the air nozzle 42, there is supplied an airflow from an air pipe 40. The airflow, as spouted from the air nozzle 42, blows the top of the float 30 obliquely, and thereby blows off the powder, as accumulated on the top of the float 30, to remove the powder.

The powder surface detector 10 is set where the powder is accumulated and in such a way that the float 30 will be placed above the accumulating powder.

When the powder accumulates for the powder surface to rise, a part of the powder surface is rising from the lower end of the guide cylinder 16 into the guide cylinder 16. At this time, the upper end of the guide cylinder 16 is open, therefore the powder, floating or flowing in air, accumulates inside the guide cylinder 16 similarly to outside the guide cylinder 16. Hence, there does not occur a very great gap between levels of the surface of the accumulating powder, that is, powder surface, inside and outside the guide cylinder 16.

Inside the guide cylinder 16, there is a possibility that the powder may accumulate also on the top of the float 30. However, the accumulated powder on the float 30 is removed therefrom by air spouting from the air nozzle 42.

If the risen powder surface contacts the bottom of the float 30 to come to support at least a part of the mass of the float 30, then the downward acting force, as applied to the mover 24 of the limit switch 20 through the hanging line 32, decreases or becomes zero.

As to the powder surface, the powder stands in a state containing such a large quantity of air that the force as applied to the float 30 by the contact of the powder surface with the float 30 is slight. However, the float 30 is extremely lightweight and its inertia is also small, therefore the float 30 is lifted even by slight external force, and the acting force as applied from the float 30 through the hanging line 32 to the mover 24 is sensitively changed.

If the stress as originally given to the mover 24 by such as spring becomes greater than the downward acting force, the mover 24 makes an upward gyratory action.

If the mover 24 makes the upward gyratory action, the electric contact is switched to light up the indicating lamp 28 through the communicating line 26.

If an operator who has seen the indicating lamp 28 stops the accumulation of the powder, the supply of the powder can be ended in a state where the powder has been accumulated to a predetermined powder surface level. If the powder-supplying system is stopped in place of the lighting of the indicating lamp 28, it is also possible to automatically stop the accumulation.

If there is a little time lag from the contact of the powder surface with the bottom of the float 30 till the stop of the accumulation, that is, supply, of the powder, or if there is accumulation by falling of a powder floating still after the stop of the supply, then there is a case where the float 30 further rises. However, if the rise of the float 30 exceeds a certain limit, the rise-restricting line 34 extends to the utmost to restrict further rise of the float 30. Accordingly, the float 30 is prevented from moving from above the guide cylinder 16 to outside it, or the hanging line 32 coming into a loosened state above the float 30 is prevented from tangling.

Thereafter, if the powder surface of the powder goes down for example by discharging the accumulated powder, the mass of the float 30 becomes not supported by the powder surface, so that the mass of the float 30 becomes applied to the mover 24 of the limit switch 20, therefore the limit switch 20 reverts to the original state of switching.

As is shown in FIG. 4, the superfine-powder hopper H is provided with the powder surface detector 10 including such as the aforementioned float 30.

The superfine-powder hopper H has an approximately cylindrical tank 50. The lower portion of the tank 50 is the shape of a taper spreading from downward to upward, and in this portion, the inner surface of the tank 50 is a tilted surface. The upper inner surface of the tank 50 is a vertical surface.

A pneumatic transportation pipe 74, which serves as a powder-supplying part, is provided to a position near the outer periphery on the top of the tank 50. The pneumatic transportation pipe 74 is connected to a powder-supplying bag 70 through a blower 72. Usually, the powder-supplying bag 70 is brought in from another factory or production company by such as truck transportation, and is therefore brought into such as the 1st floor of a factory, whereas the top of the tank 50 of the superfine-powder-storing hopper H is placed on the top floor, such as 5th floor, of the factory, therefore a considerably long-distance pneumatic transportation pipe 74 is laid from the powder-supplying bag 70 to the top of the tank 50. A worker, who connects the powder-supplying bag 70 to the pneumatic transportation pipe 74 or controls the operation of the blower 72, cannot see the accumulated state of the powder in the tank 50, and it takes him or her too heavy labor and also time to go to the top position of the tank 50 and return for the purpose of seeing the accumulated state of the powder.

The powder surface detector 10 is attached near a position opposite to the position, to which the pneumatic transportation pipe 74 is provided, with the center of the tank 50 interposed therebetween in a diametric direction on the top of the tank 50.

As to the powder surface detector 10, its guide cylinder 16 and float 30 are placed below the ceiling wall of the tank 50, and the limit switch 20 is placed outside the tank 50. The hanging line 32 extends from inside the tank 50 through its ceiling wall to the limit switch 20. The air pipe 40 is set to lead from outside the tank 50 to inside the guide cylinder 16, and air is allowed to blow the surface of the float 30 from the tip of the air pipe 40.

To the limit switch 20, there is connected the indicating lamp 28 through the communicating line 26. Furthermore, the indicating lamp 28 is connected through the communicating line 26 to a switch 75 as provided to the pneumatic transportation pipe 74. The switch 75 switches an object of the detection in at least two detection places or detectors, if necessary.

To the top of the tank 50, there is connected a discharging pipe 64. A large quantity of air, as introduced from the pneumatic transportation pipe 74 into the tank 50, is discharged into the discharging pipe 46. The discharging pipe 64 is connected through a valve to a bag filter 60. In the bag filter 60, the powder is removed from an exhaust gas, and then this exhaust gas from which the powder has been removed is discharged via an external exhaust pipe 63 to the outside. The external exhaust pipe 63 is provided with an aspirating blower 62 to promote the exhaust flow. A recovering pipe 65 is set to lead from the lower end of the bag filter 60 to the tank 50, and the recovering pipe 65 is provided with a rotary valve 66. The powder, as separated from the exhaust gas by the bag filter 60, is recovered via the recovering pipe 65 into the tank 50.

The tapered portion of the lower portion of the tank 50 is provided with breaker boys 52 (produced by Toyo Hairakku Co., Ltd., trade name: "Toyo Fine Breaker Boy") in two places opposite to each other in a horizontal direction. That is to say, the tank 50 is an inner-surface-vibrating type. The lower end of the tank 50 is provided with a quantifying feeder 54 to quantify the stored powder in the tank 50 and discharge it into a getting-out pipe 56. The breaker boys 52 generate a forced vibration to vibrate the wall surface of the tank 50, thereby preventing the powder from adhering to the inner surface of the tank 50 to make it difficult to get out the powder.

The powder which is to be stored in the superfine powder hopper H is supplied in the form stored in the powder-supplying bag 70. The powder is got out of the powder-supplying bag 70 (as connected to the pneumatic transportation pipe 74) and then supplied to the tank 50 of the superfine powder hopper H.

The superfine powder which has been supplied to the tank 50 accumulates in the tank 50, but a large quantity of air is mingled in the superfine powder, therefore it is difficult that a layer of only the superfine powder is formed. Particularly in a surface layer portion of the accumulated layer, the superfine powder is fluidized to bubble or go up into air. The powder surface of the accumulated layer is in such a state where the superfine powder and air are intermingled.

In the tank 50, a flow of a mixture of the superfine powder and air is formed, but the periphery of the float 30 is surrounded by the guide cylinder 16, therefore the float 30 is prevented from recklessly being moved, or the limit switch 20 is prevented from making an incorrect action.

As the supply of the superfine powder increases, the powder surface rises. The risen powder surface contacts the bottom of the float 30 inside the guide cylinder 16 to lift the float 30. The float 30 is easily lifted even by comparatively small force as generated by the contact of the powder surface being in the state where the superfine powder and air are intermingled.

If the float 30 is lifted by the risen powder surface, the limit switch 20 acts through the hanging line 32 to light up the indicating lamp 28.

The operator who has seen the lighting of the indicating lamp 28 stops supplying the superfine powder to the tank 50 by such as stopping the blower 72.

(Effects and Advantages of the Invention):

If the continuous production process for a water-absorbent resin powder, according to the present invention, is carried out, then the surface-modified water-absorbent resin powder having high properties can be produced continuously with high productivity in a state where the particle diameter distribution is narrow and where the properties are high, because this production process comprises the polymerizing step, the drying step, the pulverizing step, the classifying step, and the surface-modifying step, and further, the conveying steps of connecting these steps, wherein the conveying steps include at least two hoppers as follows: the buffering hopper for storing the water-absorbent resin powder and the constant-quantity-supplying hopper for quantifying and discharging the water-absorbent resin powder.

The powder surface detector, according to the present invention, can detect a slight change of force as applied to the mover of the limit switch through the hanging line wherein the change of force is caused by contact of the risen powder surface with the float as hung down by the hanging line. Therefore this detector can surely detect even the powder surface of the powder accumulation standing in a state containing a large quantity of air. Furthermore, the powder surface can surely be detected with comparatively simple structural members alone such as the float and the hanging line, therefore it becomes possible to detect the powder surface economically without need to use a complicated apparatus or detecting instrument, and further with practically sufficient accuracy.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to these examples.

The following examples of some preferred embodiments and the following comparative examples not according to the invention were carried out to test what differences of such as surface-modifying effects were made by whether the powder quantity detector was provided to the hopper or not respectively when continuous production of water-absorbent resin powders was carried out at 1,000 kg/hr for 10 days.

PRODUCTION EXAMPLE

Continuous production of a water-absorbent resin powder (at 1,000 Kg/Hr) was carried out for 10 days by the aforementioned continuous process comprising the polymerizing step, the drying step, the pulverizing step, the classifying step, the surface-crosslinking step, and the conveying steps.

Specifically, an aqueous solution of 75-mol-%-neutralized partial sodium salt of acrylic acid (concentration: 38 mass %) containing trimethylolpropane triacrylate as a crosslinking agent in a ratio of 0.05 mol % was used as an aqueous monomer solution, and this solution was continuously supplied at 2,630 Kg/Hr with a proportioning pump, while nitrogen gas was continuously blown in on the way of piping to keep the oxygen concentration at not more than 0.5 ppm. The aqueous monomer solution was further mixed with sodium persulfate/L-ascorbic acid=0.12/0.005 (g/mol of monomer) and then continuously supplied in a thickness of 23 mm onto an endless steel belt polymerization machine (steel-made endless belt having a dam of 50 mm on both edges) moving at 12 cm/minute. Because polymerization immediately started on the belt, the polymerization was run for about 20 minutes, and then the resultant crosslinked hydrogel polymer was got off from a terminal of the belt, and then continuously cut into about 5 cm, and then further divided into small pieces with a meat chopper having a die diameter of 7 mm. The resultant crosslinked hydrogel polymer had a size in the range about 1 to about 2 mm and was continuously dried by passing air (hot wind of 180° C., dew point: 60° C.) through the polymer upward and downward with a belt dryer for 25 minutes, thus obtaining a particulate dry polymer having a solid content of 94 mass %. This particulate dry polymer was continuously pulverized with a roll mill, and then what passed through 850 μm was obtained from the resultant pulverized product, thus obtaining a water-absorbent resin powder (1). The resultant water-absorbent resin powder (1) had a water absorption capacity without load (CRC) of 50 g/g and an extractable content of 18 mass %.

Example 1

Subsequent to the pulverizing step of the above Production Example, the resultant water-absorbent resin powder (1) was subjected to a surface-modifying treatment (surface-crosslinking treatment). In this surface-crosslinking step, the surface-crosslinking was carried out after the water-absorbent resin powder (1) had once been stored in a constant-quantity-supplying hopper (a) as set in the middle of the conveying step.

The constant-quantity-supplying hopper (a) includes: a tank for storing the water-absorbent resin powder (1); a supplying part which is placed in an upper portion of this tank and serves for receiving the supply of the water-absorbent resin powder (1); a discharging part which is placed in a lower portion of the aforementioned tank and serves for quantifying and discharging the water-absorbent resin powder (1); and a powder quantity detector for measuring the mass of the whole tank being in a state where the water-absorbent resin powder (1) is stored therein.

While the quantity of the stored water-absorbent resin powder (1) was controlled by the above powder quantity detector so as to be kept in the range of about 45 to about 50% of the capacity of the constant-quantity-supplying hopper (a), the water-absorbent resin powder (1) was continuously supplied at 1,000 kg/h from the constant-quantity-supplying hopper (a) to a high-speed continuous blender (Turbulizer/1,000 rpm) and spraywise blended with an aqueous surface-crosslinking agent solution including a combination of glycerol/water/isopropanol=0.5/2.0/0.5 (mass %/relative to water-absorbent resin powder (1)) by a spray which could form liquid drops of about 250 μm. Subsequently, the resultant mixture was continuously heat-treated at 195° C. with a paddle dryer for 30 minutes, and then the resultant product was classified with a sieving apparatus having a sieve mesh with a mesh opening size of 850 μm, thus obtaining a surface-modified water-absorbent resin powder (1A) including particles having particle diameters of smaller than 850 μm but not smaller than 150 μm in a ratio of not less than 90 mass %. This water-absorbent resin powder (1A) had a mass-average particle diameter of 420 μm, an absorption capacity of 28 g/g without load and a water-extractable content of 10 mass %.

Comparative Example 1

A comparative surface-modified water-absorbent resin powder (1B), including particles having particle diameters of smaller than 850 μm but not smaller than 150 μm in a ratio of not less than 90 mass %, was obtained in the same way as of Example 1 except that a constant-quantity-supplying hopper without a powder quantity detector was used as the constant-quantity-supplying hopper, in other words, the control of the quantity of the water-absorbent resin powder as stored in the constant-quantity-supplying hopper was not carried out. This water-absorbent resin powder (1B) had a mass-average particle diameter of 420 μm, an absorption capacity of 27 g/g without load and a water-extractable content of 10 mass %.

Comparative Example 2

A comparative surface-modified water-absorbent resin powder (2B), including particles having particle diameters of smaller than 850 μm but not smaller than 150 μm in a ratio of not less than 90 mass %, was obtained in the same way as of Example 1 except that the water-absorbent resin powder (1) was directly conveyed from the classifying step to the surface-modifying step with a conveying machine without using the constant-quantity-supplying hopper (a). This water-absorbent resin powder (2B) had a mass-average particle diameter of 420 μm, an absorption capacity of 27 g/g without load and a water-extractable content of 10 mass %.

Example 2

Example 1 was modified as follows. In the surface-modifying step, a surface modification using inorganic fine particles (Aerosil 200, produced by Nippon Aerosil Co., Ltd.) as an additive in a ratio of 0.5 mass % was also carried out jointly with the surface-crosslinking treatment by the aqueous surface-crosslinking agent solution. On that occasion, the inorganic fine particle powder was supplied and added to the water-absorbent resin powder (1) with a constant-quantity-supplying hopper (b). This constant-quantity-supplying hopper (b) includes: a tank for storing the inorganic fine particle powder; a supplying part which is placed in an upper portion of this tank and serves for receiving the supply of the inorganic fine particle powder; a discharging part which is placed in a lower portion of the aforementioned tank and serves for quantifying and discharging the inorganic fine particle powder; and a powder quantity detector which is placed in an upper portion of the aforementioned tank and serves for detecting the powder surface of the aforementioned inorganic fine particle powder.

In the same way as of Example 1 except the above modification, there was obtained a surface-modified water-absorbent resin powder (2A) including particles having particle diameters of smaller than 850 μm but not smaller than 150 μm in a ratio of not less than 90 mass %. This water-absorbent resin powder (2A) had a mass-average particle diameter of 420 μm, an absorption capacity of 28 g/g without load and a water-extractable content of 10 mass %.

Comparative Example 3

A comparative surface-modified water-absorbent resin powder (3B), including particles having particle diameters of smaller than 850 μm but not smaller than 150 μm in a ratio of not less than 90 mass %, was obtained in the same way as of Example 2 except that a constant-quantity-supplying hopper without a powder quantity detector was used as the constant-quantity-supplying hopper, in other words, the control of the quantity of the water-absorbent resin powder as stored in the constant-quantity-supplying hopper was not carried out. This water-absorbent resin powder (3B) had a mass-average particle diameter of 420 μm, an absorption capacity of 27 g/g without load and a water-extractable content of 10 mass %.

Shown in Table 1 are the results of having tested the surface-modified water-absorbent resin powders for the absorption capacity under load (AAP), the saline flow conductivity (SFC), the hygroscopic flowability, the solid content in gel, and operational trouble as results of the above Examples and Comparative Examples. Therfrom, the necessity of setting the powder quantity detector is well understood.

classifying step, and a surface-modifying step, and further, conveying steps of connecting these steps, and is characterized in that:

the water-absorbent resin powder is obtained by a process including the step of polymerizing an unsaturated monomer and has a crosslinked structure, and has a mass-average particle diameter of 300 to 600 μm, and includes particles having particle diameters of 850 to 150 μm in a ratio of not less than 90 mass % in particle diameter distribution, and has a property of displaying an absorption capacity of not less than 25 g/g without load, and has a water-extractable content of not more than 25 mass %; and the conveying steps include at least two hoppers for storing and discharging the water-absorbent resin powder after the pulverizing step wherein at least one of the hoppers includes:

a tank for storing the water-absorbent resin powder;

a supplying part which is placed in an upper portion of the tank and serves for supplying the water-absorbent resin powder into the tank;

a discharging part which is placed in a lower portion of the tank and serves for discharging the water-absorbent resin powder from the tank; and a detector for detecting the quantity of the powder in the tank.

2. A continuous production process for a water-absorbent resin powder according to claim 1, wherein the at least two hoppers are a buffering hopper for storing and discharging the water-absorbent resin powder and a constant-quantity-supplying hopper which is placed downstream of the buffering hopper and serves for quantifying and discharging the water-absorbent resin powder.

3. A continuous production process for a water-absorbent resin powder according to claim 1, further comprising a second conveying step for conveying an additive powder for modifying the water-absorbent resin powder,

TABLE 1

|  | Type and or nonuse of powder quantity detector | Surface-modified water-absorbent resin powder No. | AAP | SFC | Hygroscopic flowability | Solid content in gel | Operational trouble |
| --- | --- | --- | --- | --- | --- | --- | --- |
| Example 1 | Load cell | (1A) | 25 | 11 | — | 99 | None |
| Example 2 | Float type | (2A) | 24 | 40 | Good | 99 | None |
| Comparative Example 1 | Nonuse | (1B) | 23 | 10 | Inferior | 99 | Occurred |
| Comparative Example 2 | Nonuse | (2B) | 21 | 9 | Inferior | 99 | Occurred |
| Comparative Example 3 | Nonuse | (3B) | 23 | 38 | Inferior | 99 | Occurred |

(Note 1) Operational trouble: instability of properties, non-uniformity of surface modification, flow clogging, etc.
(Note 2) Blocking property of powder when absorbing moisture (60 RH%)

What is claimed is:

1. A continuous production process for a water-absorbent resin powder, which is a process for continuously producing a surface-modified water-absorbent resin powder comprising a polymerizing step, a drying step, a pulverizing step, a wherein the second conveying step includes a constant-quantity-supplying hopper for quantifying and discharging at least the additive powder as a hopper for storing and discharging the additive powder, wherein the constant-quantity-supplying hopper includes:

a tank for storing the additive powder;

a supplying part which is placed in an upper portion of the tank and serves for supplying the additive powder into the tank;

a discharging part which is placed in a lower portion of the tank and serves for discharging the additive powder from the tank; and a detector for detecting the quantity of the powder in the tank.

4. A continuous production process for a water-absorbent resin powder according to claim 1, wherein the tank is an inner-surface-vibrating type tank.

5. A continuous production process for a water-absorbent resin powder according to claim 1, wherein the supplying part is connected to a pipe for transporting the water-absorbent resin powder and/or an additive powder by an airflow.

6. A continuous production process for a water-absorbent resin powder according to claim 2, wherein the quantity of the water-absorbent resin powder and/or an additive powder as stored in the constant-quantity-supplying hopper is controlled into the range of 20 to 80% (capacity ratio) relative to the whole capacity of the hopper.

7. A continuous production process for a water-absorbent resin powder according to claim 1, wherein the production output of the water-absorbent resin powder is not less than 500 Kg/hr.

8. A continuous production process for a water-absorbent resin powder according to claim 1, wherein the water-absorbent resin powder exhibits an absorption capacity of not less than 20 g/g under a load and a saline flow conductivity of not less than 20 ($10^{-7} \times cm^3 \times s \times g^{-1}$).

9. A continuous production process for a water-absorbent resin powder according to claim 1, wherein the surface-modifying step includes the steps of: adding a dehydration-reactable surface-crosslinking agent to the water-absorbent resin powder; and heat-treating the water-absorbent resin powder, resultant from the adding step, in the range of 150 to 250° C.

10. A continuous production process for a water-absorbent resin powder according to claim 2, wherein the constant-quantity-supplying hopper is a hopper for storing the water-absorbent resin powder which is to be supplied to the surface-modifying step, and wherein the detector is a powder quantity detector for measuring the mass of the whole hopper containing the water-absorbent resin powder.

11. A continuous production process for a water-absorbent resin powder according to claim 2, wherein the constant-quantity-supplying hopper is a hopper for storing an additive powder which is to be supplied to the surface-modifying step, wherein the additive powder is a superfine powder, and wherein the detector is a detector for detecting a powder surface in the quantifying hopper.

* * * * *

UNITED STATES PATENT AND TRADEMARK OFFICE
CERTIFICATE OF CORRECTION

PATENT NO. : 6,727,345 B2
DATED : April 27, 2004
INVENTOR(S) : Katsuhiro Kajikawa et al.

Page 1 of 1

It is certified that error appears in the above-identified patent and that said Letters Patent is hereby corrected as shown below:

Column 4,
Line 48, "Buffering", should read -- Constant-quantity-supplying --.
Line 54, "Constant-quantity-supplying", should read -- Buffering --.

Column 10,
Lines 24-25, cancel "a hydrogel polymer which will form".

Column 16,
Line 44, "05", should read -- 0 to 5 --.

Column 21,
Line 1, "Areosil", should read -- Aerosil --.
Line 22, after "10", insert -- parts by --.

Column 23,
Line 46, "cm2", each occurrence, should read -- $cm^2$ --.

Column 29,
Line 40, "46", should read -- 64 --.

Signed and Sealed this

Twentieth Day of July, 2004

JON W. DUDAS
*Acting Director of the United States Patent and Trademark Office*